(12) United States Patent
Fukunaga

(10) Patent No.: US 6,346,940 B1
(45) Date of Patent: Feb. 12, 2002

(54) VIRTUALIZED ENDOSCOPE SYSTEM

(75) Inventor: Tomohisa Fukunaga, Tochigi-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/031,661

(22) Filed: Feb. 27, 1998

(30) Foreign Application Priority Data

| Feb. 27, 1997 | (JP) | ................................................ | 9-044435 |
| Feb. 27, 1997 | (JP) | ................................................ | 9-044436 |
| Feb. 27, 1997 | (JP) | ................................................ | 9-044441 |
| Feb. 27, 1997 | (JP) | ................................................ | 9-044495 |
| Jan. 26, 1998 | (JP) | ................................................ | 10-013074 |

(51) Int. Cl.[7] ............................................. G06T 15/00
(52) U.S. Cl. ...................... 345/427; 345/420; 345/424; 345/629; 345/630; 600/111; 382/103
(58) Field of Search ................................. 345/419, 435, 345/473, 424, 420, 427, 629, 630; 600/111, 427; 128/653.1; 382/103

(56) References Cited

U.S. PATENT DOCUMENTS

| 5,261,404 | A |   | 11/1993 | Mick et al. |         |
| 5,458,111 | A |   | 10/1995 | Coin        |         |
| 5,611,025 | A |   | 3/1997  | Lorensen et al. |     |
| 5,638,819 | A | * | 6/1997  | Manwaring et al. ..... | 128/653.1 |
| 5,782,762 | A |   | 7/1998  | Vining      |         |
| 5,920,319 | A |   | 7/1999  | Vining et al. |       |
| 5,986,662 | A | * | 11/1999 | Argiro et al. ............... | 345/424 |
| 6,083,162 | A |   | 7/2000  | Vining      |         |
| 6,108,005 | A | * | 8/2000  | Starks et al. ................. | 345/419 |
| 6,139,490 | A | * | 10/2000 | Breidenthal et al. ......... | 600/111 |
| 6,167,142 | A | * | 12/2000 | Nozaki ........................ | 382/103 |
| 6,167,296 | A | * | 12/2000 | Shahidi ........................ | 600/427 |

OTHER PUBLICATIONS

"Virtualized Endoscope System—An Application of Virtual Reality Technology to Diagnostic Aid"; Kensaku Mori et al.; IEICE Trans. Inf. & Syst., vol. E79–D, No. 6, Jun. 1996; pp. 809–819.

* cited by examiner

*Primary Examiner*—Cliff N. Vo
*Assistant Examiner*—Kimbinh T. Nguyen
(74) *Attorney, Agent, or Firm*—Oblon, Spivak, McClelland, Maier & Neustadt, P.C.

(57) ABSTRACT

An image processing system displaying an endoscopic image of a three-dimensional object from a desired viewpoint position and view direction. A three-dimensional model preparation unit prepares a three-dimensional model of the object and an endoscopic image preparation unit prepares a first image of the three-dimensional model as viewed from the viewpoint position and view direction. A simulated endoscopic examination of a virtual subject can be realized by permitting an operator to change the viewpoint position and view direction to coincide with the movement of a virtual endoscope. The usefulness of the virtual endoscope is enhanced with various features of the invention which facilitate control over the virtual endoscope and make the virtual images useful in the insertion of a real endoscope. Such features include: the superimposition of endoscopic images; an indicator image which indicates the orientation of the virtual endoscope relative to the organ being examined; a compass image indicating the orientation of a virtual subject relative to the virtual endoscope tip; guiding markers which indicate the direction in which the virtual or real endoscope is to be advanced; and focus markers which reveal the location of predetermined conditions such as a nidus within the virtual subject. A virtual operation device, modeled after an actual endoscope operating member, is used to control movement of the virtual endoscope tip within the virtual subject.

29 Claims, 34 Drawing Sheets

| (X, Y, Z) | (Dirx, Diry, Dirz) | (Upx, Upy, Upz) |
|---|---|---|
| (0, 0, 0) | (1, 0, 0) | (0, 0, 1) |
| (1, 0, 0) | (1, 0, 0) | (0, 0, 1) |
| (2, 0, 0) | (0, 0, 1) | (-1, 0, 0) |

FIG. 26a
 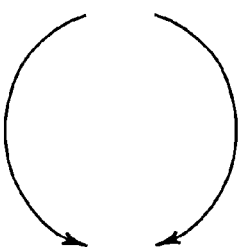
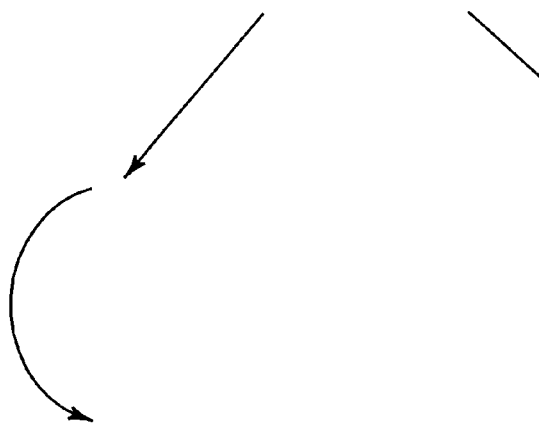
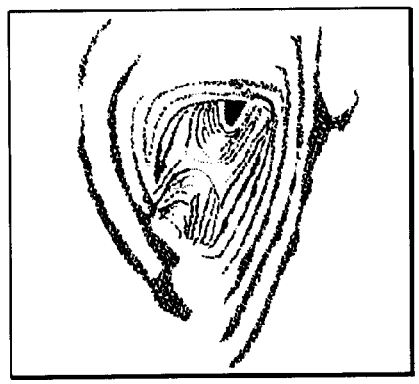 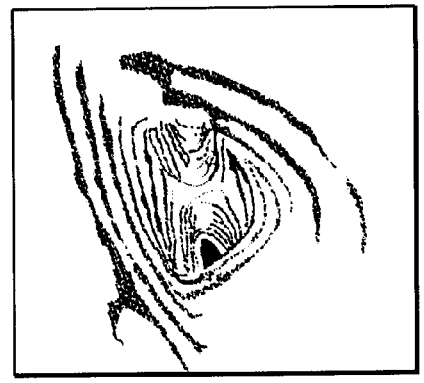
FIG. 26b          FIG. 26c

VIRTUALIZED ENDOSCOPE SYSTEM

BACKGROUND OF THE INVENTION

1. Field of the Invention

The present invention relates to a virtualized endoscope system, which is used to simulate an endoscopic examination and to facilitate an operator's control over the tip of an endoscope of the type disclosed by Mori et al., "Virtualized Endoscope System—an application of virtual reality technology to diagnostic aid," IEICE Trans. Inf. & Syst., Vol. E 79-D, No. 6, pp. 809–819, June 1996, which is incorporated by reference herein.

2. Discussion of the Background

FIG. 1 shows an electronic endoscope system 1. An endoscope 2 has an endo scope tip 2a which is inserted into the body of a subject 3a on a treatment table 3b. An actual image based on the image signals from the endoscope 2 is displayed on a monitor 5 of the main unit 4. An operator uses the endoscope operating member 2b to maneuver the endoscope tip 2a while observing the actual image on the monitor 5. Thus, different images corresponding to different viewpoint positions and view directions (lines of sight) can be obtained by moving the endoscope tip 2a within the body of the subject 3a.

It is desirable for the tip of the endo scope tip 2a to reach the area of interest quickly and accurately without damaging the inside of a tubular cavity inside the subject 3a. For this reason, an image processing device 6 is installed near the electronic endoscope system 1 as shown in FIG. 1. The image processing device 6 stores, for example, a three-dimensional image (3D organ image) providing an external view of the organ to be examined. The 3D organ image is displayed on a monitor 7 while an operator operates the endoscope 2.

The operator uses the 3D organ image in the monitor 7 of the image processing device 6 as a guiding image to advance the endoscope tip 2a by comparing the guiding image with the actual image displayed on the monitor 5.

If the actual image on the monitor 5 of the electronic endoscope system 1 displays, for example, a branched tubular cavity, the operator decides which direction the endoscope tip 2a is to be inserted by looking at the 3D organ image on the monitor 7.

Further, if segmented images, X-ray photographs, etc., of the subject 3a have been obtained in advance by using CT, MR devices, etc., the operator decides which direction the endoscope tip 2a is to be advanced by looking at the segmented images, X-ray photographs, etc.

It is difficult for the operator to advance the endoscope tip 2a based on the images from the monitors 5 and 7. Further, the operator may have trouble discerning the orientation of the endoscope tip 2a in relation to the posture of the subject 3a from the display on the monitor 5. Even though the operator can change the view direction freely, it is more important that the operator be able to discern the current view direction and viewpoint position.

Since the guiding image is an external view of the organ, it is difficult for an operator in an endoscopic examination room to determine the direction in which the endoscope tip 2a is facing inside a tubular cavity, the orientation of the endoscope tip 2a relative to the body of the subject 3a, and the direction in which the endoscope tip 2a is moving relative to the body of the subject 3a. Consequently, the operator advances the endoscope tip 2a by trial and error while viewing the monitor 5 of the electronic endoscope system 1.

Even if the relative position of the endoscope tip 2a is known from segmented images or photographs, the depths of tubular cavities are difficult to discern. Therefore, the operator has to refer to multiple segmented images or photographs of a particular tubular cavity to estimate the depth of the tubular cavity before advancing the endoscope tip 2a.

SUMMARY OF THE INVENTION

Accordingly, one object of this invention is to provide a novel virtualized endoscope system that makes it easier to recognize and control the direction of the tip of a virtual endoscope or an actual endoscope inserted into a subject to be examined.

It is yet another object of this invention to enable an operator to quickly and easily obtain guiding images for guiding the tip of a virtual endoscope or an actual endoscope, even when the guiding images are generated in a distant simulation room.

It is still yet another object of this invention to provide an image processing system capable of being used in preoperative simulations and in training to simulate the control of an actual endoscope.

These and other objects are achieved according to the present invention by providing a new and improved method, system, and computer product wherein a three-dimensional object is displayed from a desired viewpoint position and view direction. A three-dimensional model preparation unit prepares a three-dimensional model of the object and an endoscopic image preparation unit prepares a first endoscopic image of portions of the three-dimensional model as viewed from the viewpoint position and view direction. The first endoscopic image is then displayed in a first display.

A rear image floating unit prepares for display a second endoscopic image of second portions of the three-dimensional model which are behind the first portions relative to the viewpoint position and otherwise hidden from view behind the first portions. The second endoscopic image is displayed in the first display such that the first and second endoscopic images are superimposed spatially in relation to the viewpoint position and view direction.

An endoscope tip state computation unit calculates the current viewpoint position and view direction and prepares an outer shape image of the three-dimensional object which is an image of the three-dimensional model with the inner surfaces of the three-dimensional model hidden. The outer shape image is displayed in a second display. The endoscope tip state computation unit also prepares an indicator image which indicates the viewpoint position, view direction, and a reference direction.

An object preparation unit displays a focus mark at a location relative to the outer shape image to mark a condition in a coordinate system which is inclusive of the location of the condition in the three-dimensional object. The focus mark may be used to mark the location of a particular area of interest such as a tumor inside a virtual human body.

A compass image preparation unit generates a compass image and displays the compass image over the first image. The compass reveals the orientation of the image obtained from a virtual endoscope tip relative to the posture of the subject being examined.

A guiding marker preparation unit displays guiding markers in the first display. The guiding markers are used to guide the insertion of an actual or a virtual endoscope into a subject. These markers can also be transferred, via a first data sender and receiver, to a second image processing system in an examination room. The first image, the compass image, and the outer shape images may also be transferred to the second image processing system. The second image processing system in the examination room may request, via a second data sender and receiver, that endoscopic guide data corresponding to a particular subject be sent from the first data sender and receiver.

An image moving and rotating unit changes the first image based on the operation of a toolbox. Keys on the toolbox allow an operator to change the view direction or rotate the first image. Another toolbox controls the operation path history control unit which can record and reproduce a sequence of past images corresponding to a sequence of past viewpoint positions. The sequence of past images can be played continuously or advanced frame-by-frame.

A virtual operation device having the look and feel of an actual endoscope operating member is provided to realistically simulate the control of an actual endoscope. The virtual operation device includes an operation member having a grip and a dial which are used to control movement of a virtual endoscope tip within a virtual human body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 26(a), 26(b), and 26(c) are illustrations showing rotation of the endoscopic image;

DESCRIPTION OF THE PREFERRED EMBODIMENT

Figure 2:
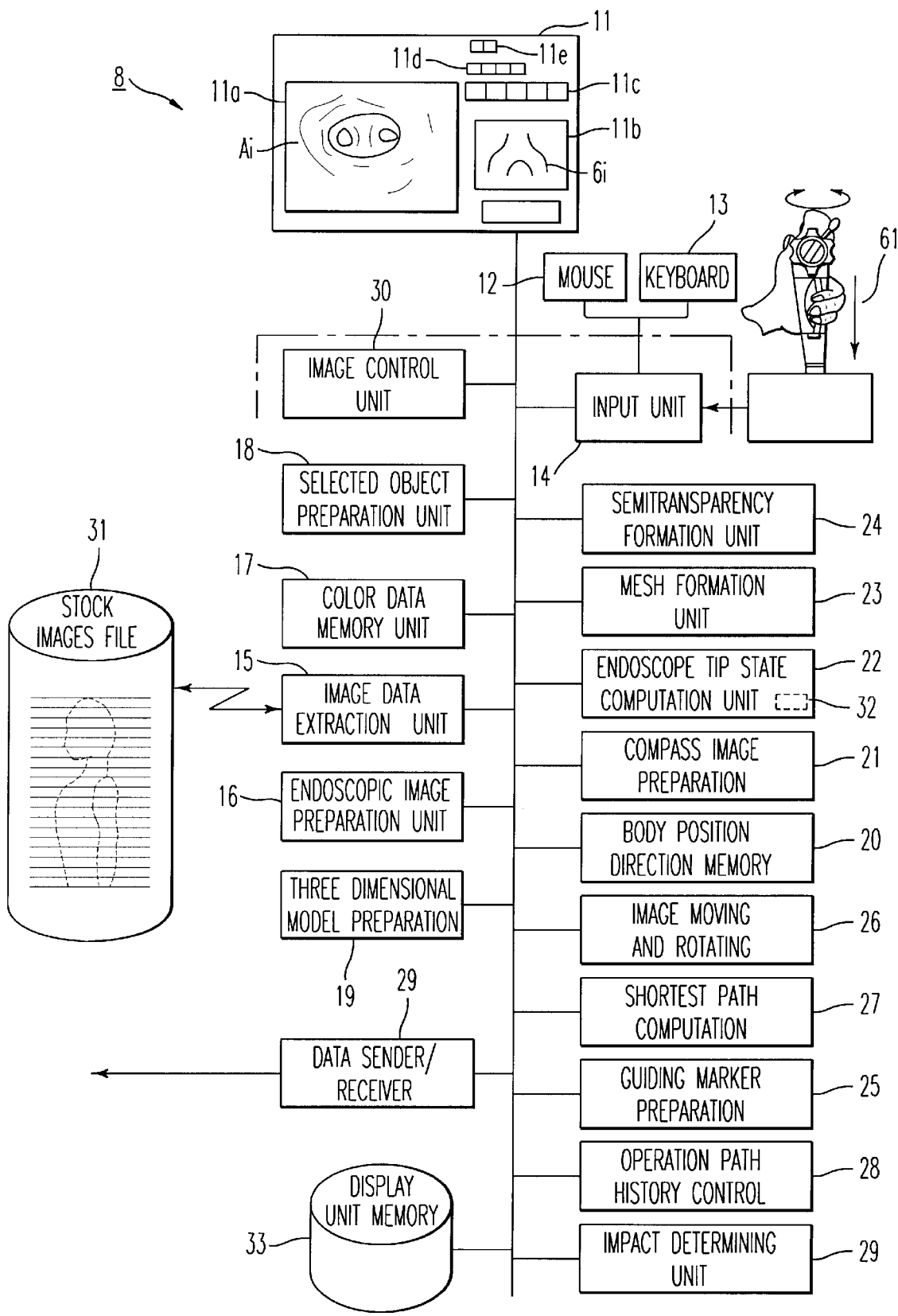
FIG. 2 is schematic illustration of an image processing system.

Referring now to the drawings, wherein like reference numerals designate identical or corresponding parts throughout the several views, and more particularly to FIG. 2 thereof, the image processing system 8 has the following components: a display unit 11; a mouse 12, a keyboard 13, and a virtual operation device connected to an input unit 14; an image data extraction unit 15; an endoscopic image preparation unit 16; a color data memory unit 17; a selected object preparation unit 18; a three-dimensional model preparation unit 19; a body position direction memory unit 20; a compass image preparation unit 21; an endoscope tip state computation unit 22; a mesh formation unit 23; a semitransparency formation unit 24; a guiding marker preparation unit 25; an image moving and rotating unit 26; a shortest path computation unit 27; an operation path history control unit 28; a data sender and receiver 29; an image control unit 30; a stock images file 31; an outer shape image preparation unit 32; a display unit memory 33; and an impact determining unit 79. The invention may be implemented on a computer workstation with computer readable instructions that can be stored on a computer readable medium, as described hereinbelow with reference to FIG. 39.

Figure 3:
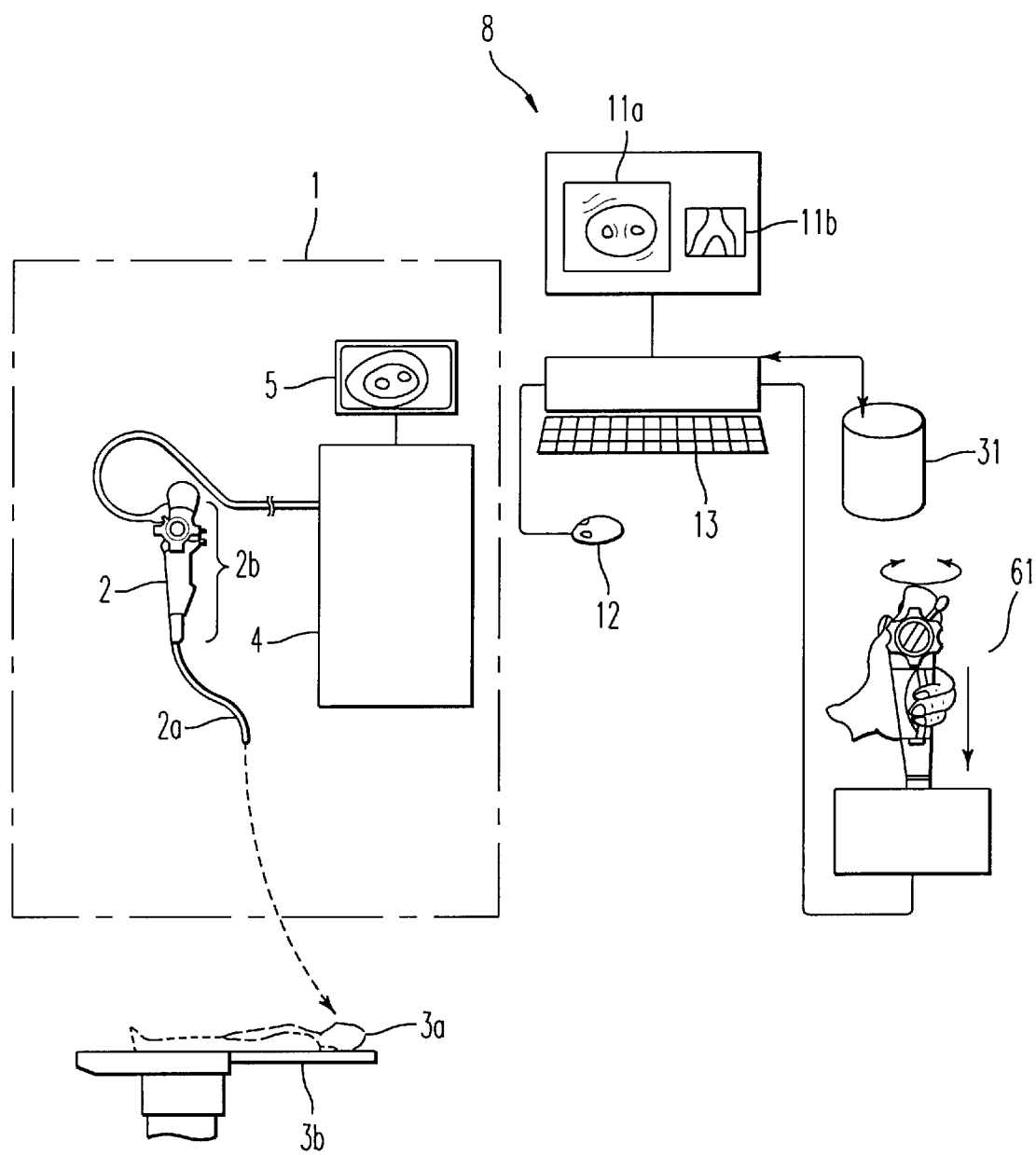
FIG. 3 is a schematic illustration of an electronic endoscope device used with an image processing system.

If the image processing system 8 of this invention as described above is installed adjoining an electronic endoscope system 1 as shown in FIG. 3, the actual insertion of the endoscope tip 2a into the subject 3a can be carried out while viewing virtual images on the display unit 11 of the image processing system 8 and real images on the monitor 5 of the electronic endoscope system 1. Prior to an examination of the subject 3a with the real electronic endoscope system 1, an operator can use the image processing system 8 to prepare virtual images containing endoscopic guide data. If, during the examination of the subject 3a, a doctor becomes interested in a particular area of the body, or if the doctor cannot easily determine in which way to advance the endoscope tip 2a within the subject 3a, the doctor may play through recorded simulation images with the image processing system 8 until the virtual image corresponds to the image on the monitor 5. In this manner, the doctor may refer to endoscopic guide data (focus marks, guiding markers, etc.) on the display unit 11 of the image processing system 8. Also, a doctor may play the recorded simulation images before beginning an examination with the real electronic endoscope system 1 so that a desired image is being displayed on the display unit 11 of the image processing system 8.

Referring back to FIG. 2, the display unit 11 includes a main display 11a which displays an endoscopic image Ai, a subdisplay 11b which displays a outer shape image Bi (an external view of the three-dimensional model of the body part being examined), an operation path history toolbox 11c, an image movement and rotation toolbox 11d, a measurement toolbox 11e, etc. Alternatively, the endoscopic image Ai may be displayed in the subdisplay 11b, and the outer shape image Bi may be displayed in the main display 11a.

The input unit 14 receives commands as a result of operation of the mouse 12, keyboard 13, toolboxes 11(c) through 11(e), and the virtual operating device 61, and initiates the operation of other components in the image processing system 8. For example, clicking the left button of the mouse 12 generates a command to move the viewpoint position in the direction opposite the current view direction (i.e., a command to retract the virtual endoscope); clicking the right button of the mouse 12 generates a command to move the viewpoint position in the direction of the current view direction (i.e., a command to advance the virtual endoscope); depressing "J", "H", "K", or "L" on the keyboard 13 generates a command to rotate the view direction down, left, up, or right, respectively, about the viewpoint position; and depressing the "Home" key or the "End" key rotates the virtual endoscope left or right, respectively, about the view direction.

The image data extraction unit 15 loads multiple stock images of the subject stored in the stock images file 31 and prepares stock images for display on the display unit 11.

The endoscopic image preparation unit 16 prepares an endoscopic image Ai which is an image of a three-dimensional model (explained later) which is a virtual representation of the subject 3a. (See Lorenson et al., "Marching Cubes: A High Resolution 3D Surface Construction Algorithm," Computer Graphics SIGGRAPH '87 Conference Proceedings, Vol. 21, No. 4, pp.163–169, July 1987, incorporated by reference herein as cited by Mori et al. supra). The visual field represented by the endoscopic image Ai corresponds to the viewpoint position and view direction from which the three-dimensional model of a particular organ is observed. When the viewpoint position is inside the three-dimensional model, the endoscopic image Ai is a view of the interior of the three-dimensional model. If the viewpoint position is outside of the three-dimensional model, the endoscopic image Ai is a view of the exterior of the three-dimensional model. The endoscopic image Ai is processed by the image control unit 30 and displayed on the main display 11a.

The color data memory unit 17 stores color data for the images displayed in the display unit 11. These images include the endoscopic image Ai, the three-dimensional model image Bi, a body position direction compass image Mi (shown in FIG. 4), etc. The color information memory unit 17 can also store color information for focus marks in the selected object preparation unit 18, explained later, and for the coordinate position of a particular area of interest in the three-dimensional model.

The selected object preparation unit 18 stores focus marks which are graphic shapes (e.g., stars or cubes) representing a predetermined condition in the subject 3a (e.g., a tumor). The selected object preparation unit 18 also stores colors and coordinates representing the location of the predetermined condition in a three-dimensional coordinate system which is representative of the virtual body and which includes the predetermined condition and the three-dimensional model. The selected object preparation unit 18 prepares for display in the subdisplay 11b adjacent to the outer shape image a focus mark at a location representative of the spatial relation between the predetermined condition and the outer shape image in the three-dimensional coordinate system.

The three-dimensional model preparation unit 19 collects a prescribed number of stock images loaded by the image data extraction unit 15 and processes these images by performing, among other things, pixel processing and shading. The stock images may be obtained from a CT device or an MRI device, for example. Next, the three-dimensional model preparation unit 19 constructs a three-dimensional model of these stock images. The three-dimensional model is a virtual representation of the human body.

The body position direction memory unit 20 stores body position information of the virtual subject. The body position information includes information relating to the posture of the subject 3a.

The compass image preparation unit 21 prepares a body position direction compass image Mi showing the orientation of the viewpoint position and view direction relative to the directions of the left side, right side, feet, head, back, and chest of the subject 3a. The image control unit 30 processes the body position direction compass image Mi for display on the endoscopic image Ai. The body position direction compass image Mi is explained in greater detail below by way of reference to FIG. 19.

The endoscope tip state computation unit 22 is used to prepare for display an indicator image Ci (FIG. 4) showing the state of a virtual endoscope tip. The state of the endoscope tip is the orientation of the endoscope tip in relation to the virtual human body and refers to the view direction, the viewpoint position, and a reference direction. The reference direction lies on a plane perpendicular to the view direction and points in the same direction as the upward vector which is described in greater detail herein. The indicator image Ci is based on the viewpoint position and view direction used in the endoscopic image preparation unit 16 and on body position information stored in the body position direction memory unit 20. The indicator image Ci is explained in greater detail below by way of reference to FIGS. 5, 8, and 9.

Further, the endoscope tip state computation unit 22 has an outer shape image preparation unit 32 which prepares an outer shape image Bi of the three-dimensional object (also called a three-dimensional model image) for display in an outer shape image display, such as the subdisplay 11b on the display unit 11. The outer shape image Bi is an external image of the three-dimensional model with the interior of the three-dimensional model hidden. The indicator image Ci is displayed either inside or outside the outer shape image Bi, depending on whether the viewpoint position is inside or outside, respectively, the three-dimensional model of the organ being examined.

Together, the semitransparency unit 24 and the mesh formation unit 23 are generically called a rear image floating unit. The rear image floating unit superimposes images of the three-dimensional model so that portions of the three-dimensional model which are visually obstructed from the viewpoint position can be viewed simultaneously with the unobstructed portions of the three-dimensional model.

The mesh formation unit 23 reads in the endoscopic image Ai prepared in the endoscopic image preparation unit 16. The segmented stock images forming the endoscopic image Ai are dissociated to construct contours lines for the portions of the three-dimensional model which are unobstructed visually. The contour lines are then decimated to form points, and adjacent points are connected with lines to form meshes which can be displayed on the main display 11a. In this manner, portions of the three-dimensional object, which were previously hidden behind the portions of the three-dimensional model shown in the endoscopic image Ai, can be seen through the mesh.

The semitransparency formation unit 24 reads in the endoscopic image Ai of the endoscopic image preparation unit 16. The pixels forming the endoscopic image Ai are thinned out according to conditions which include an adjustable degree of transparency, and the transparent endoscopic image Ai is displayed on the main display 11a.

Figure 18:
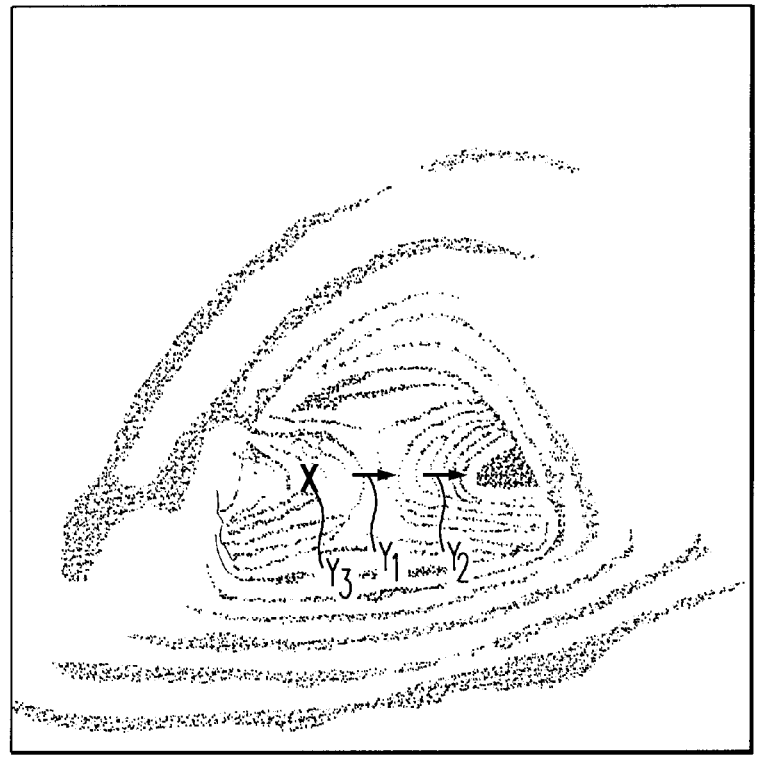
FIG. 18 is an illustration of guiding markers on an endoscopic image.

The guiding marker preparation unit 25 forms guiding markers (explained later) on the endoscopic image Ai, as shown in FIG. 18, when a guiding marker display command is input. Guiding markers are used to indicate the direction in which either a virtual endoscope or an actual endoscope should proceed. Typical examples of guiding markers are right direction arrows, left direction arrows, Xs indicating no entrance, up direction arrows, down direction arrows, optional direction arrows, text indicating the names of positions, objects, paths to take, etc. The type of guiding marker, the three-dimensional coordinate positions within the endoscopic image Ai, characters to indicate the names of positions or objects, etc., may be stored in memory.

The image moving and rotating unit 26 moves or rotates endoscopic images Ai of the main display 11a based on changes in the view direction caused by the operation of the image movement and rotation toolbox 11d, explained later.

Figure 27:
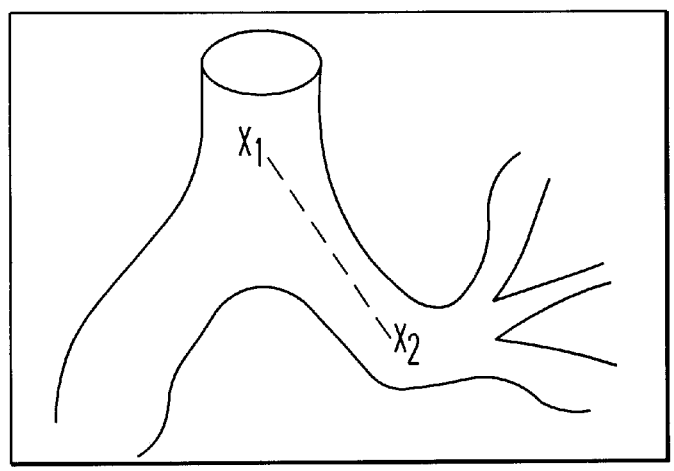
FIG. 27 is an illustration of two points on the three dimensional model.

The shortest path computation unit 27 determines and measures the shortest path between two points indicated inside the outer shape image Bi in subdisplay 11b based on the operation of a key 11e2 (shown in FIG. 6) of the measurement toolbox 11e. The shortest path between the two points is displayed inside the outer shape image Bi as shown in FIG. 27. If multiple viewpoint positions are indicated on the outer shape image Bi, then the shortest path connecting the viewpoint positions is determined and displayed on the subdisplay 11b. Once the shortest path is found, the three-dimensional coordinates corresponding to points along the shortest path may be successively sent to the endoscopic image preparation unit 16 so that successive endoscopic images of the three-dimensional model, as viewed along the shortest path, are prepared. The successive display of the prepared images simulates the movement of the virtual endoscope along the shortest path.

The operation path history control unit 28 stores the images shown by the main display 11a and subdisplay 11b, the three-dimensional coordinates of all viewpoints passed, and an ID code associated with a particular subject in the display unit memory 33. The operation path history control unit 28 successively registers the viewpoint position and the view direction each time that the viewpoint position or the view direction is changed so that endoscopic images, outer shape images, etc., can be reproduced on the display unit 11. The operator activates the operation path history toolbox 11c to control the recording and playback operations of the operation path history control unit 28. In this manner, it is possible to record virtual images produced during a simulated examination, and later reproduce the recorded virtual images to replay the path taken by the virtual endoscope during the simulated examination.

The data sending and receiving unit 29 responds to transfer requests from an optional second image processing system 9 in the endoscopic image examination room (shown in FIG. 33) by sending endoscopic guide data from the display unit memory to the second image processing system 9. The transfer requests may include the ID code for a particular subject. In that case, the endoscopic guide data associated with the subject whose ID code was received with the transfer request is accessed and sent to the second image processing system 9.

The image control unit 30 controls the images on the display unit 11 based on events fed from the input unit 14 and instructions from the components described above.

Figure 5A:
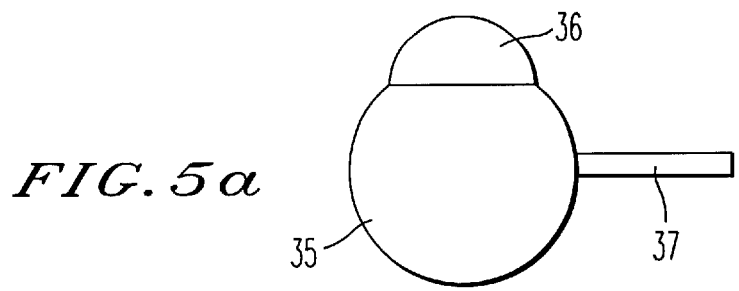
FIGS. 5(a) and 5(b) are illustrations of indicator images.

The indicator image Ci, shown in FIGS. 5(a) and (b), includes, for example, a yellow sphere 35, a green hemisphere 36 attached to the yellow sphere 35, and a red bar 37 extending from the yellow sphere 35. The yellow sphere 35 indicates the viewpoint position, the green hemisphere 36 above it indicates the reference direction, and the red bar 37 indicates the view direction.

Figure 6A:
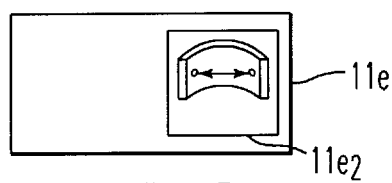
FIGS. 6(a), 6(b), and 6(c) are illustrations of a measurement toolbox, an image movement and rotation toolbox, and an operation path history toolbox, respectively.
Figure 6B:
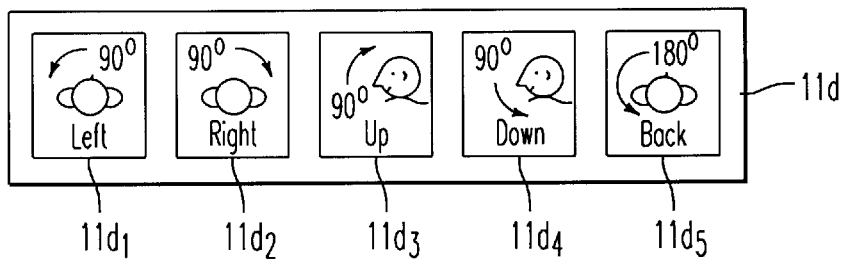

The measurement toolbox 11e, the image movement and rotation toolbox 11d, and the operation path history toolbox 11c are shown in FIGS. 6(a), (b), and (c), respectively, as they appear on the display unit 11. The measurement toolbox 11e has a key 11e2 to carry out measurement functions, etc., such as a distance measurement along the shortest path between two points. The image movement and rotation toolbox 11d has a key 11d1 to carry out a command moving the endoscopic image to the right (i.e, rotate the view direction left), a key 11d2 to carry out a command moving the endoscopic image to the left (i.e, rotate the view direction right), a key 11d3 to carry out a command moving the endoscopic image to the down (i.e, rotate the view direction up), a key 11d4 to carry out a command moving the endoscopic image to the up (i.e, rotate the view direction down), and a key 11d5 to reverse the view direction.

The operation path history toolbox 1c has various keys for carrying out memorization, reproduction, etc. These keys include a key 11c1 to stop recording or reproduction, a key 11c2 to start recording, a key 11c3 to pause recording, a key 11c4 to return to the previous frame, and a key 11c5 to begin reproduction, and key 11c6 to advance to the next frame.

The impact determining unit 79 stores the dimensions of the virtual endoscope (e.g., the diameter of the tip, the length of the endoscope, etc.) and determines whether the virtual endoscope is capable of passing through a particular organ, such as a blood vessel, when the viewpoint position changes. When the viewpoint position cannot be advanced, a warning alarm is sounded and/or displayed. The impact determining unit 79 also determines whether the virtual endoscope is capable of reaching a given viewpoint position when the viewpoint position is changed. When a selected viewpoint position cannot be reached, the endoscopic image Ai is not displayed for that viewpoint position. In this manner, the simulation of an actual endoscopic examination can be made more realistic. The impact determining unit may also be deactivated so that changes in the viewpoint position can be made freely, permitting portions of the body which are not accessible by an actual endoscope to be examined.

Semi Transparency and Mesh Display

Figure 7:
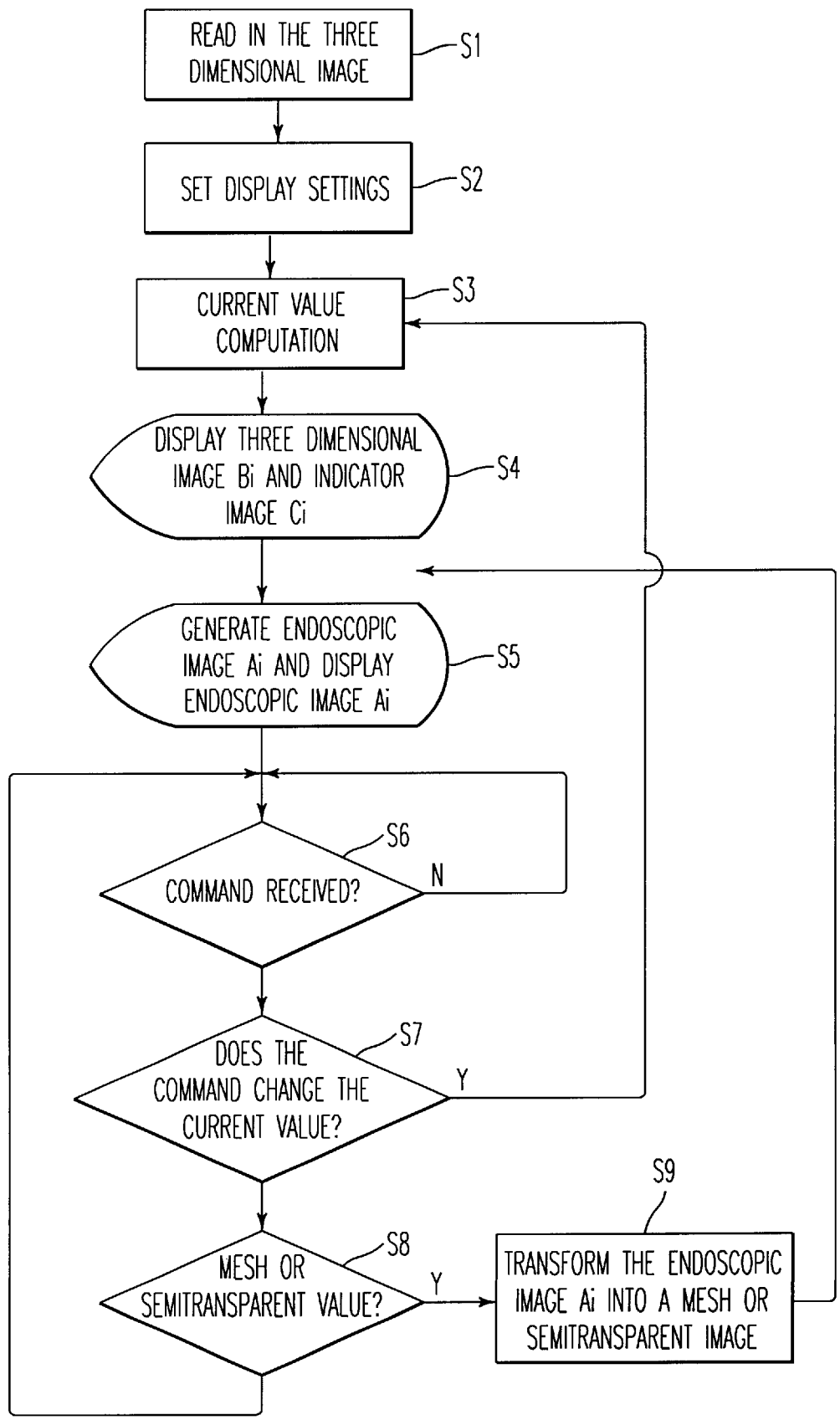
FIG. 7 is a flowchart of the mesh and semitransparency functions.

FIG. 7 is a flow chart that describes the main steps for forming semitransparent and mesh displays of a tubular cavity with the image processing system 8 described above.

Figure 13:
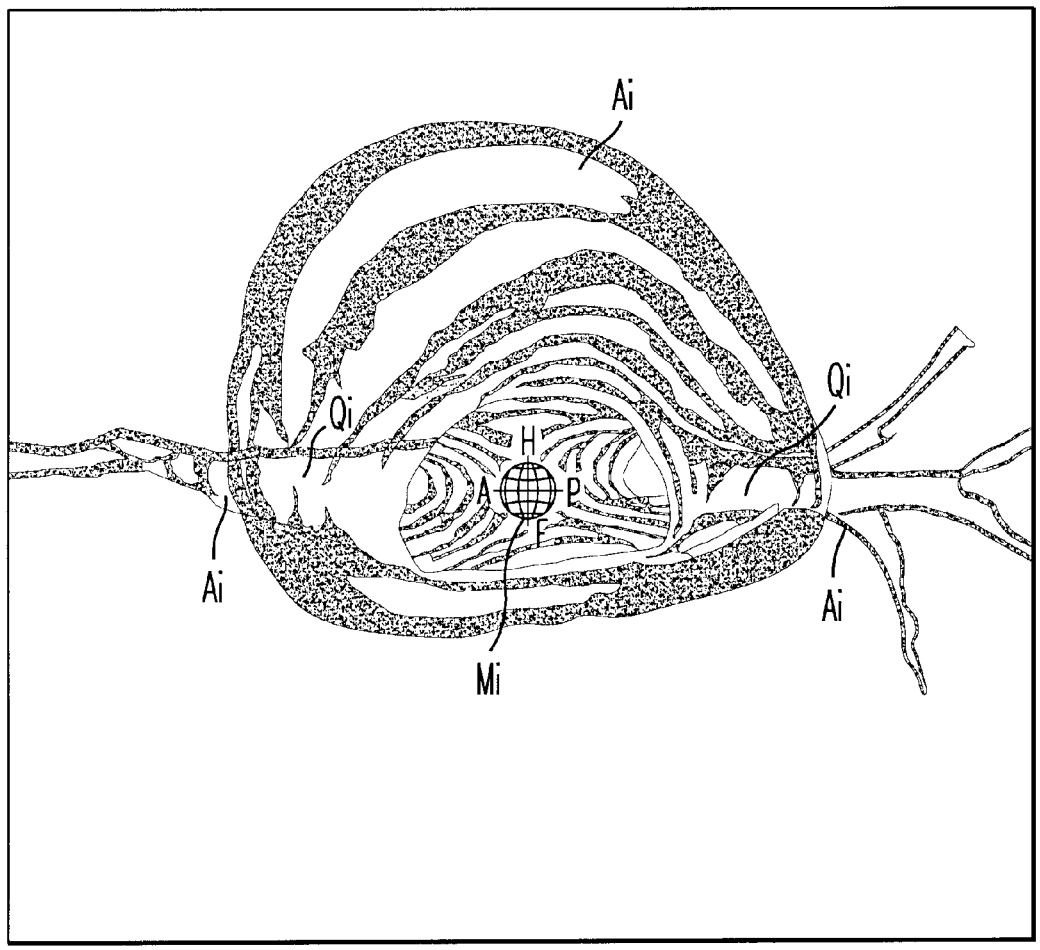
FIG. 13 is an illustration of a semitransparent endoscopic image and a compass image.
Figure 21:
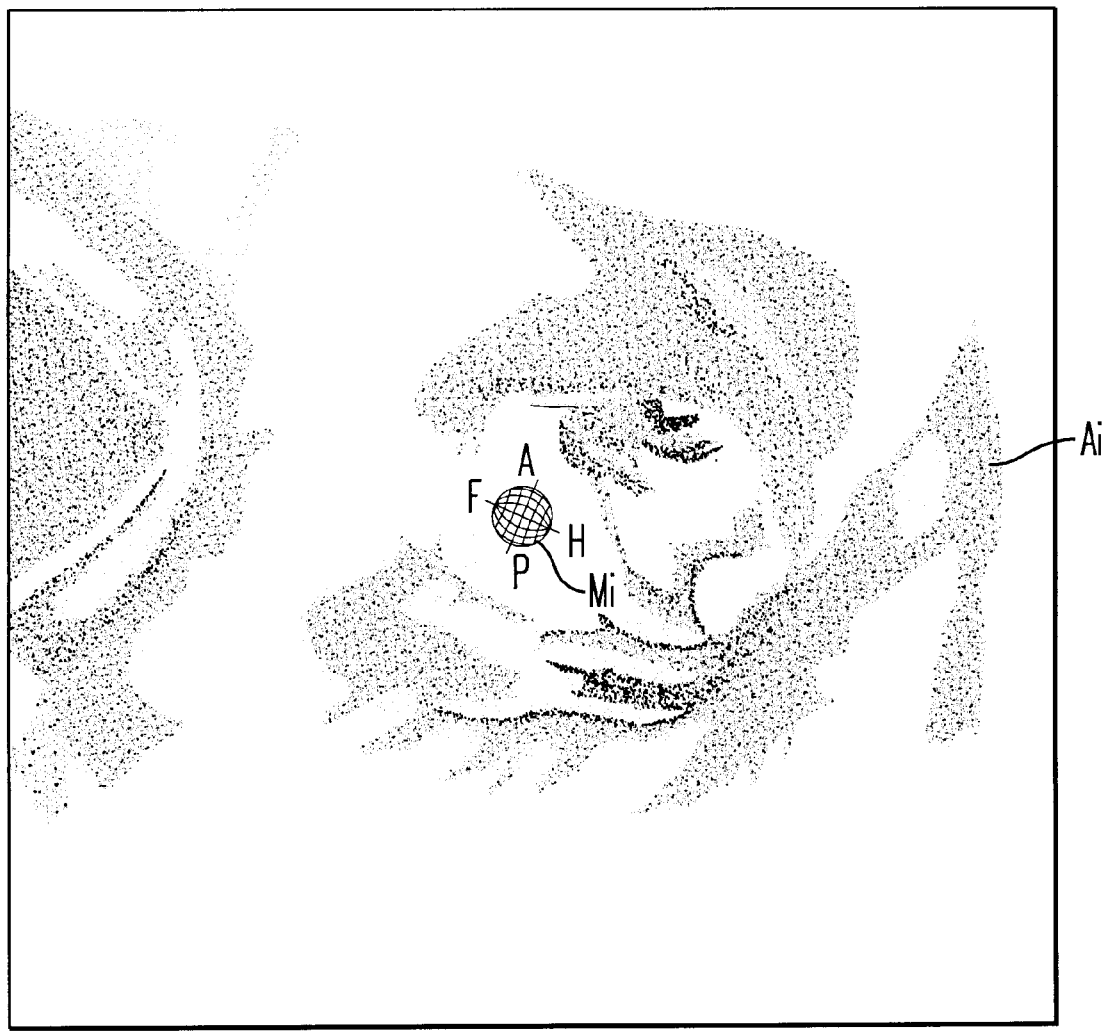
FIG. 21 is an illustration of a body position direction compass over an endoscopic image of a bronchial tube.

In step S1 the image data extraction unit 15 reads in multiple stock images of the subject 3a which have been stored in advance in the stock images file 31, and the three-dimensional model preparation unit 19 processes the stock images (e.g., by performing pixel formation and shading) and constructs the three-dimensional model of the tubular cavity. The endoscopic image preparation unit 16 reads in the endoscopic image data of the three-dimensional model corresponding to the visual field in the viewpoint position and view direction. If the viewpoint position is outside the three-dimensional model and the three-dimensional model is a branching tubular cavity, an endoscopic image Ai, simulating the view from an endoscope tip which is external to the branching tubular cavity, may be obtained as shown in FIG. 13, for example. If the viewpoint position is set all the way inside the three-dimensional model, it is possible to obtain an endoscopic image Ai which simulates the view from an endoscope tip which has been inserted into the branching tubular cavity (i.e., a fly-through display), as shown in FIG. 21, for example. The mouse 12 may be used to initiate the read-in of the endoscopic image Ai.

Next, in step S2 the mouse 12 and keyboard 13 are used to set color and other display settings in the image control unit 30 for the endoscopic image Ai and the outer shape image Bi.

In step S3 the endoscope tip state computation unit 22 performs current value computation processing based on the endoscopic display data read in step S1 to determine the current viewpoint position and the current view direction of the virtual endoscope tip. Furthermore, when the current value changes, the endoscope tip state computation unit 22 performs current value computation processing to determine the distance, direction, etc., of the change in the viewpoint position and view direction to update the viewpoint position, view direction, and reference direction of the virtual endoscope tip.

Figure 8:
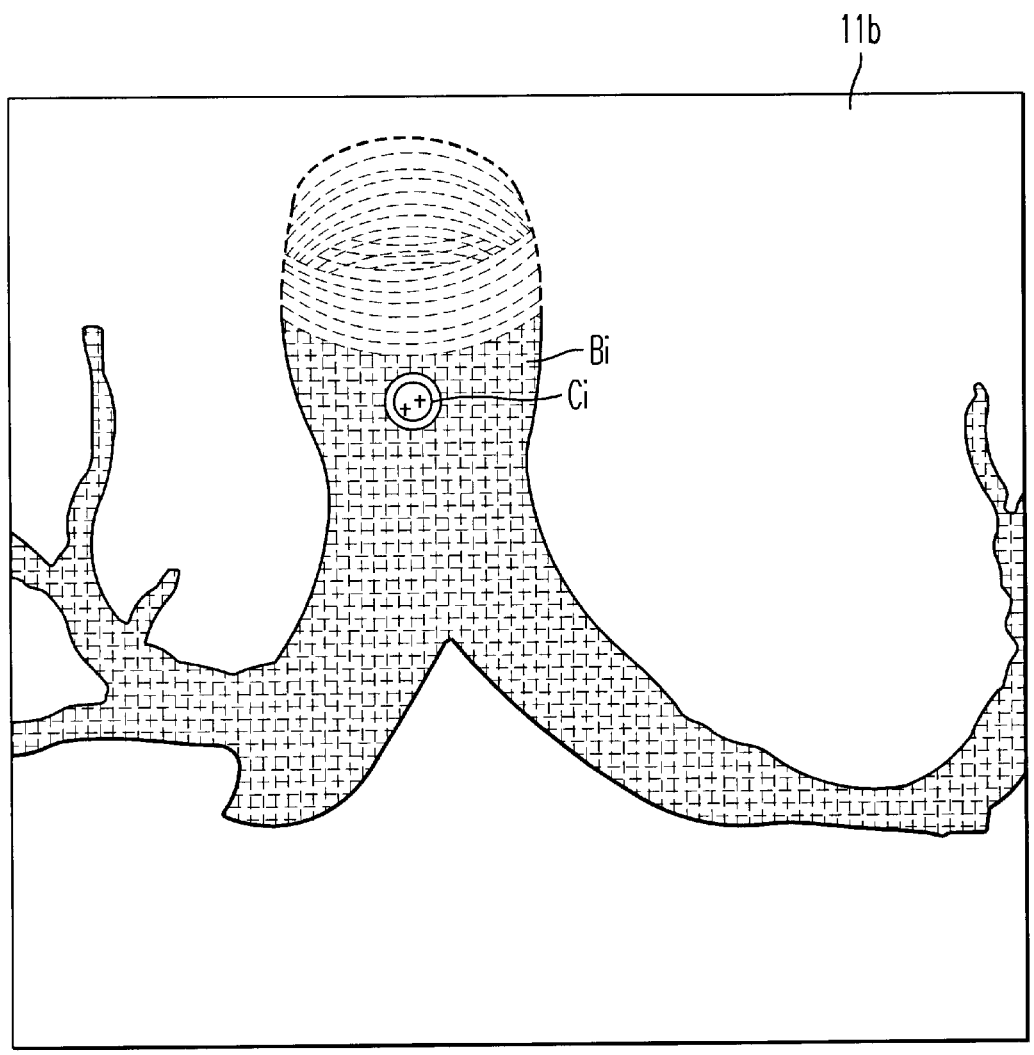
FIG. 8 is an illustration of an indicator image inside the outer shape image.
Figure 9:
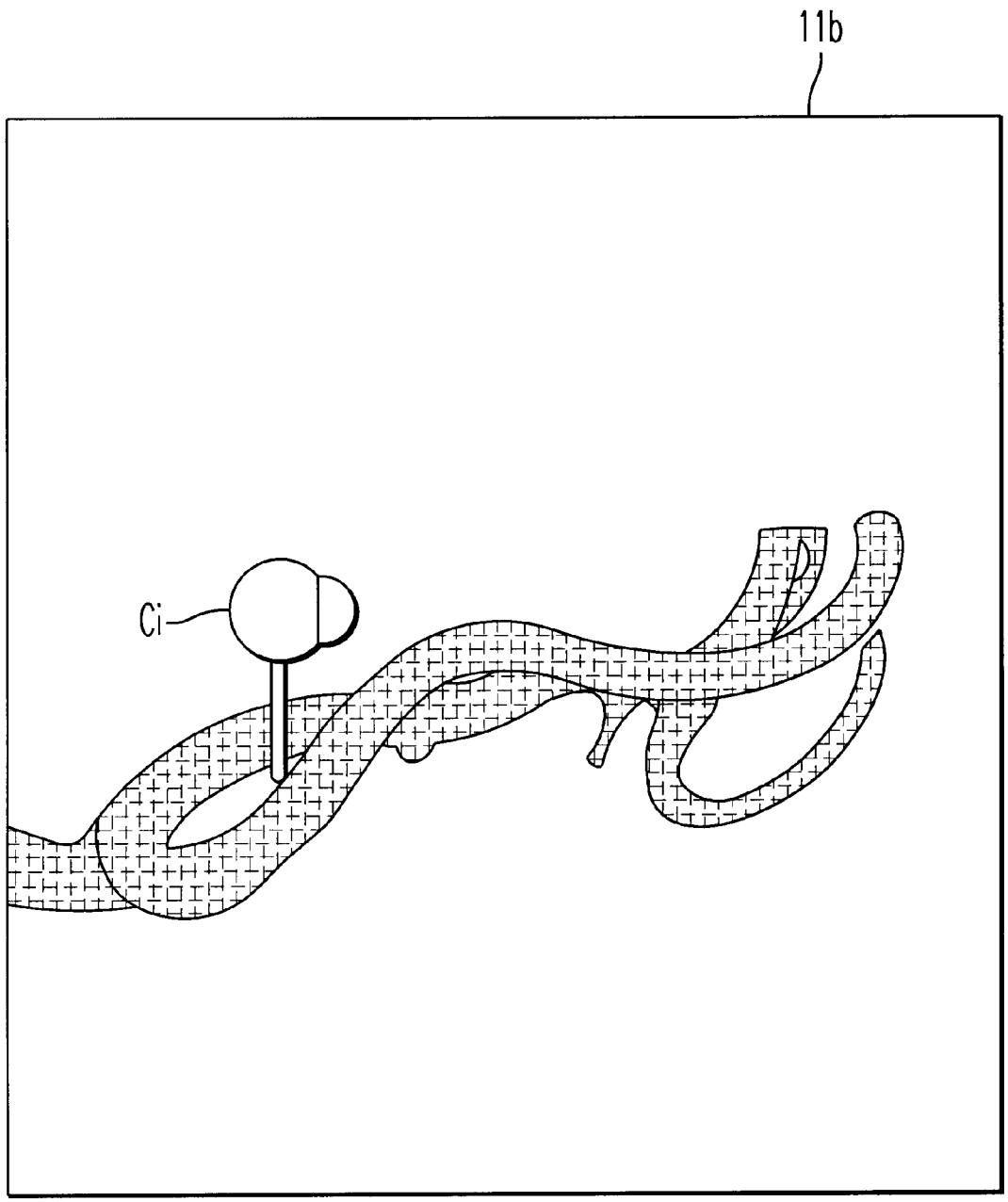
FIG. 9 is an illustration of an indicator image outside the outer shape image.

Next, in step S4 the outer shape image preparation unit 32 prepares the outer shape image Bi which is an external image of the three-dimensional model with the inner portions hidden. The outer shape image Bi is displayed on the subdisplay 11b. Furthermore, the endoscope tip state computation unit 22 displays the indicator image Ci showing the viewpoint position, view direction, and the top of the endoscope tip (as determined in step S3) in the outer shape image Bi. For example, if endoscopic display data for the bronchi are read, an outer shape image Bi of a tubular cavity and indicator image Ci may be displayed as shown in FIG. 8. If endoscopic display data for blood vessels in the brain are read, an outer shape image Bi and indicator image Ci may be displayed as shown in FIG. 9. The display of the indicator image Ci on the outer shape image Bi permits the operator to easily determine the viewpoint position and view direction from which the three-dimensional model is being viewed.

Figure 10A:
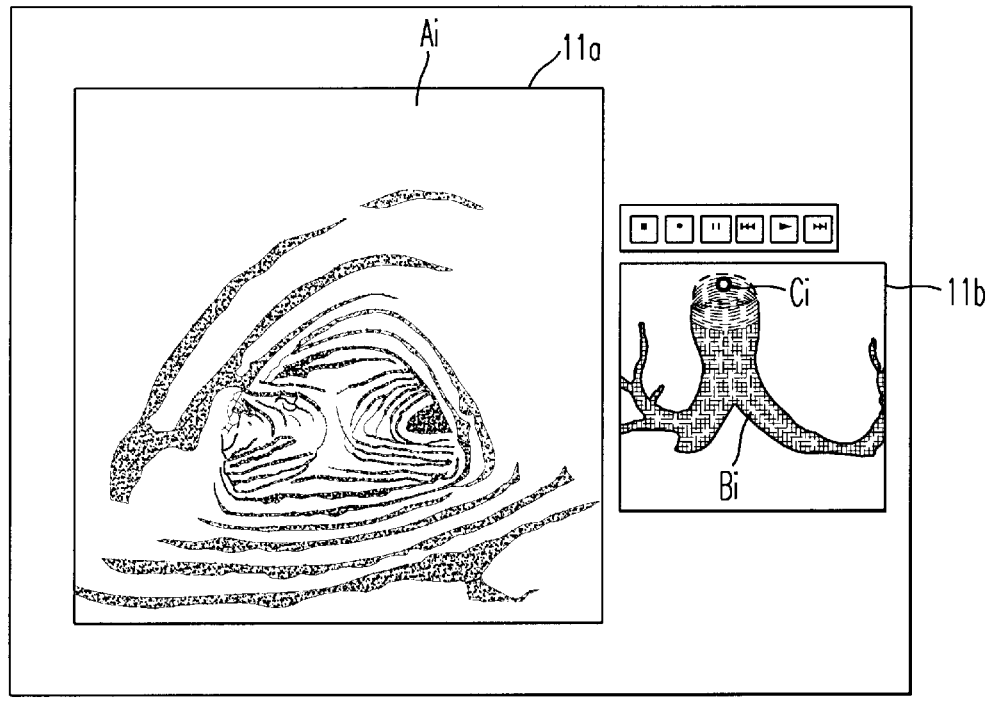
FIGS. 10(a) and 10(b) are illustrations showing movement of the viewpoint position.

Then, in step S5 the endoscopic image preparation unit 16 prepares for display an endoscopic image Ai from the endoscopic display data read in. When the three-dimensional model is a model of an organ, an endoscopic image Ai as shown in FIG. 10(a), for example, might be displayed on the main display 11a. Behind the endoscopic image Ai relative to the viewpoint position, the remaining structure of the three-dimensional model is hidden from view.

In step S6 the input unit 14 then determines whether or not a command has occurred. If a command has occurred, in step 7 the input unit 14 determines whether or not the current value is changed by the event. If a change in the current value is detected in step S7, the process is returned to step S3 and the indicator image Ci is moved to reflect the change in the current value. The endoscopic image preparation unit 16 is informed of the new position of the virtual endoscope tip, and an updated endoscopic image Ai, reflecting the new current value, is displayed on the main display 11a.

Figure 10B:
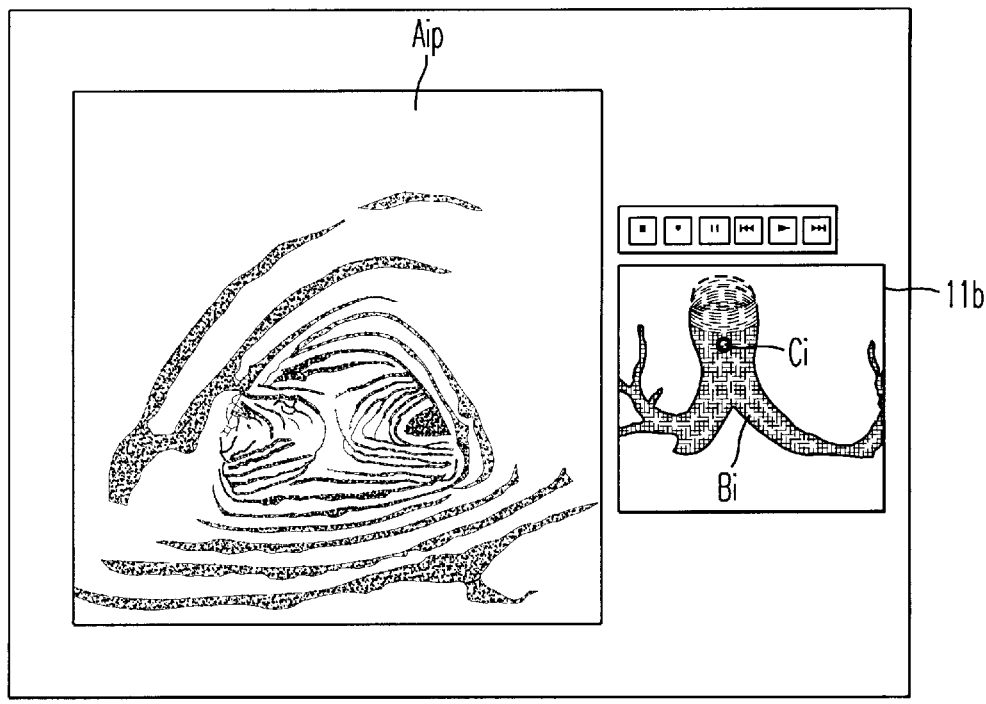

The operator can change the current value by using the mouse 12 to select a new viewpoint position on the subdisplay 11b. For example, if it is desired to view a particular area of interest directly when the display unit 11 shows the display of FIG. 10(a), the cursor is brought to the desired viewpoint position on the outer shape image Bi of the subdisplay 11b and the mouse 12 is clicked. As a result, the main display 11a shows a new endoscopic image Aip corresponding to an image of the three-dimensional model from the new viewpoint position and view direction as shown in FIG. 10(b).

Figure 11:
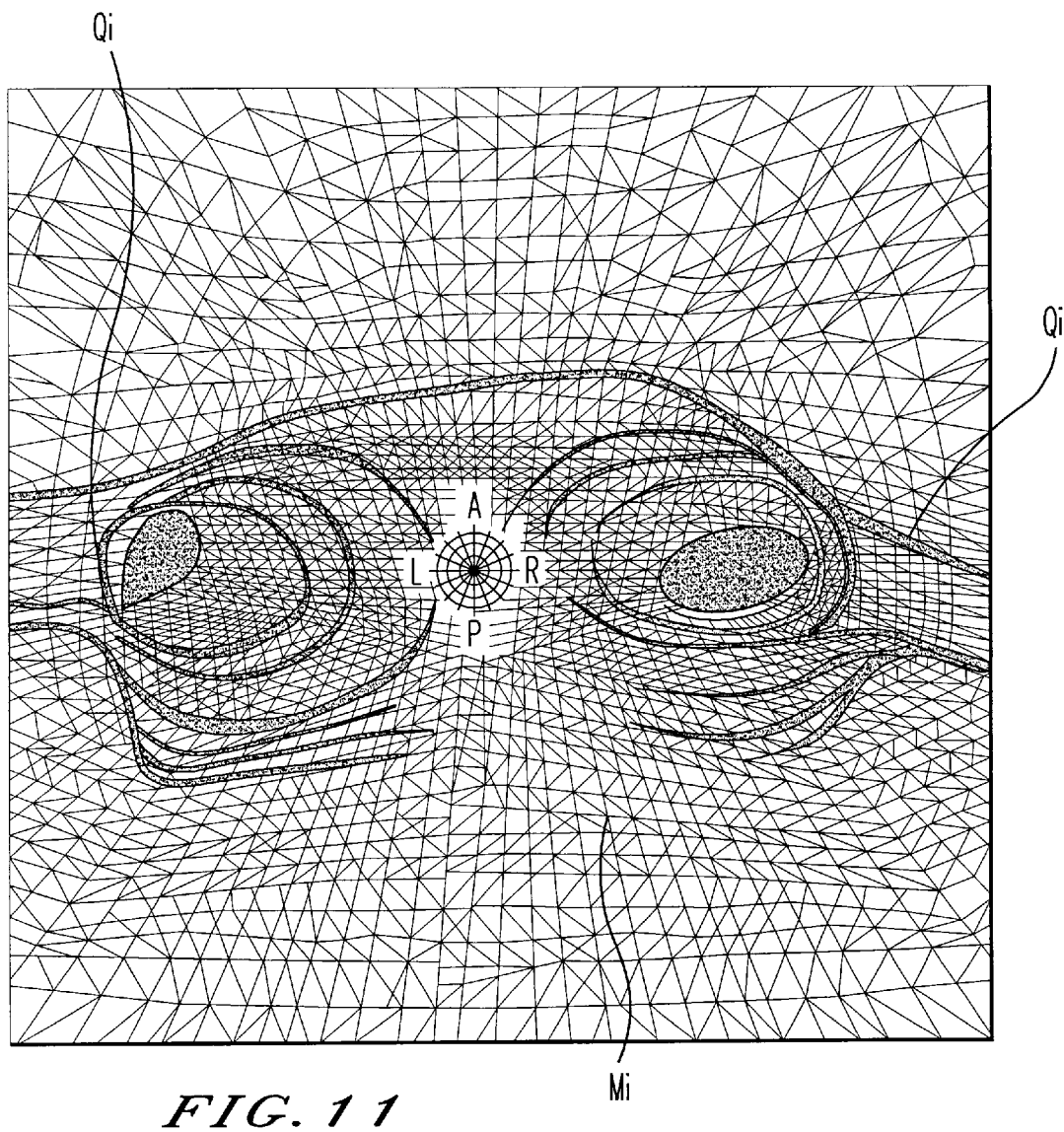
FIG. 11 is an illustration of a meshed endoscopic image and a compass image.
Figure 12:
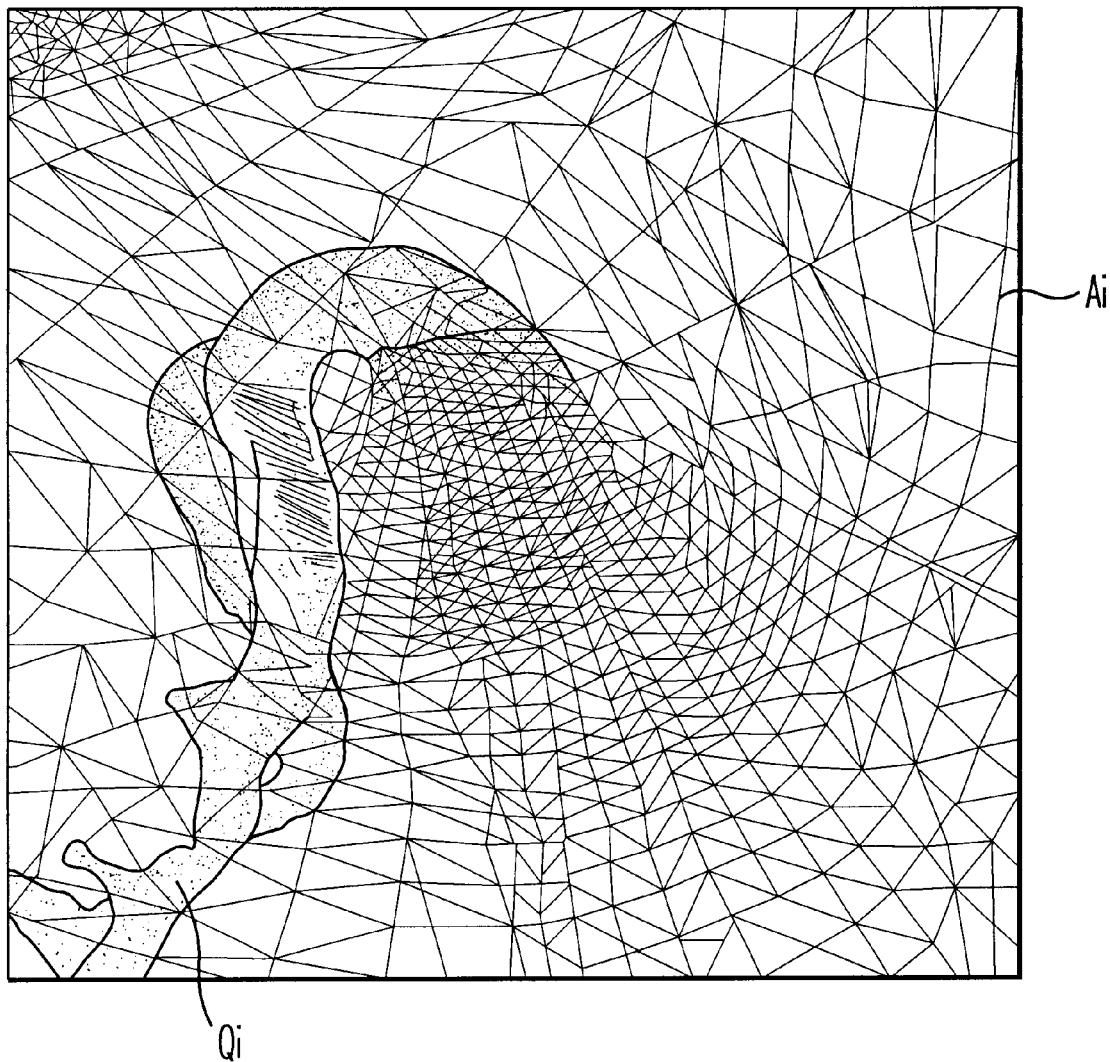
FIG. 12 is an illustration of an endoscopic image wherein only the portions of a three-dimensional object which are unobstructed from view are meshed.

If no change in the current value has occurred in step S7, in step S8 the input unit 14 determines whether or not a mesh or semitransparency formation command has occurred. If there is no mesh or semitransparency formation command, the process is returned to step S6 to wait for a command. If a mesh formation command has occurred in step S8, the mesh formation unit 23 causes the endoscopic image Ai to be transformed into a mesh image, further revealing the inside of the tubular cavity as shown in FIGS. 11 and 12 for example. If a semitransparency formation command has occurred, then in step S9 the semitransparency formation unit 24 causes the endoscopic image Ai shown in the main display 11a to be made semitransparent, revealing the tubular cavity further as shown in FIG. 13, and the process returns to step S5.

Mesh and semitransparency display commands permit the operator to view previously hidden portions of the three-dimensional object. Therefore, it is easier for an operator to confirm in which direction to proceed when navigating the virtual human body or when comparing the endoscopic image Ai to an actual image on the monitor 5 of the electronic endoscope system 1.

Figure 4:
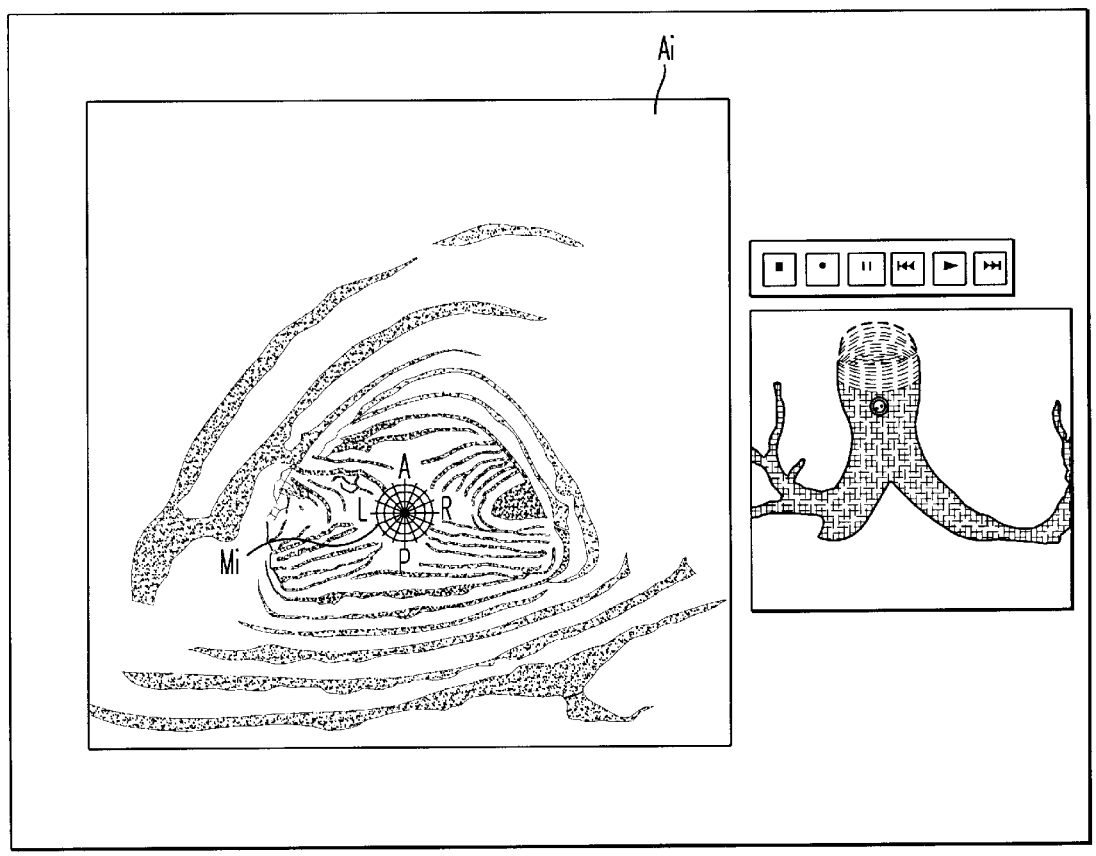
FIG. 4 is an illustration of an endoscopic image display, a compass image, and an operation path history toolbox as they appear on a monitor.
Figure 5B:
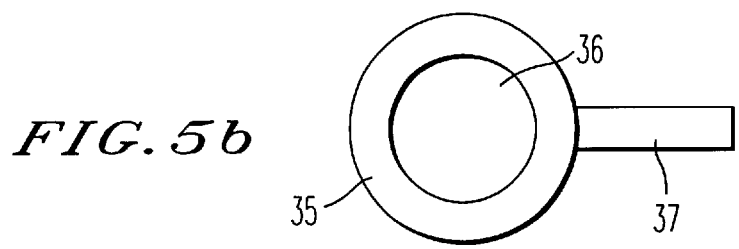
Figure 14:
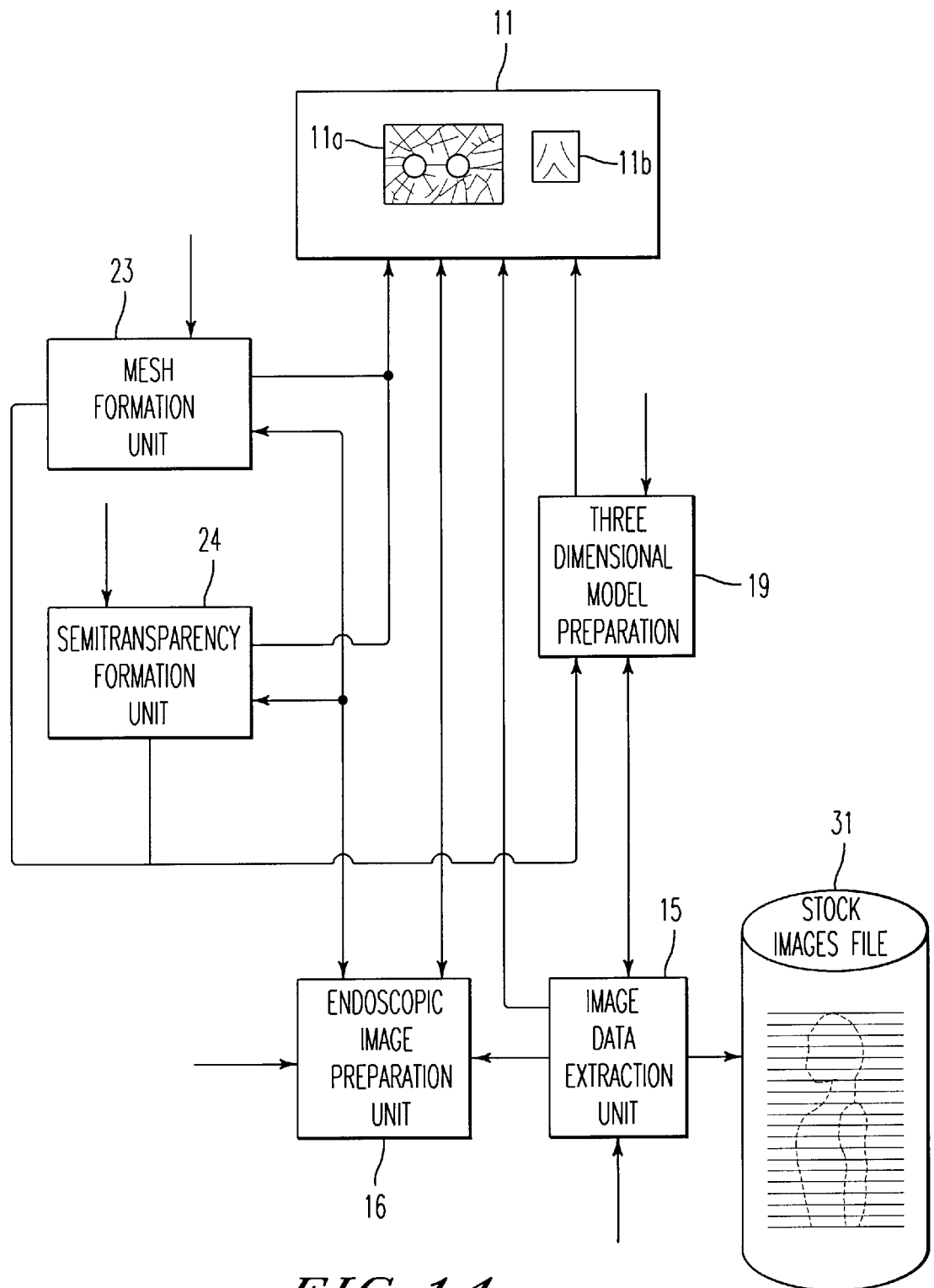
FIG. 14 is a schematic illustration showing the major components used for mesh formation and semitransparency formation.

FIG. 14 is a block diagram for explaining mesh formation and semitransparency formation. It is assumed that the endoscopic image Ai of FIG. 4 is in the main display 11a of the display unit 11 and that the outer shape image Bi of FIG. 4 is in the subdisplay 11b.

If the keyboard 13 is operated to change to a mesh display mode when the endoscopic image Ai is being displayed, the mesh formation unit 23 changes the endoscopic image Ai prepared in the endoscopic image preparation unit 16 to a mesh image. Outline extraction (or core extraction in the case of a blood vessel, for example) is performed on the endoscopic image Ai prepared by the endoscopic image preparation unit 16. This is accomplished by extracting vertical contour lines from the segmented images forming the endoscopic image Ai. The vertical contour lines are decimated into point sequences, and points are connected with lines to form a triangular wire frame model. The endoscopic image Ai is made into a mesh image which is superimposed over a rear image Qi of the previously hidden portions of the three-dimensional model. In this manner the previously hidden portions of the three-dimensional model are revealed through the mesh image as shown in FIG. 12. Alternatively, the rear image Qi may also be meshed, as shown in FIG. 11.

If the keyboard 13 is operated to change to a semitransparent display mode, the semitransparency formation unit 24 causes the endoscopic image Ai of the endoscopic image preparation unit 16 to become transparent by thinning the pixels based on a preset degree of transparency. This preset degree of semitransparency can be adjusted by the operator. In the semitransparent display mode, the endoscopic image Ai of the three-dimensional model is made semitransparent as shown in FIG. 13. The semitransparent endoscopic image Ai is superimposed with a rear image Qi of the previously hidden portions of the three-dimensional model so that the previously hidden portions can be viewed simultaneously with the visually unobstructed portions of the three-dimensional model.

Figure 15A:
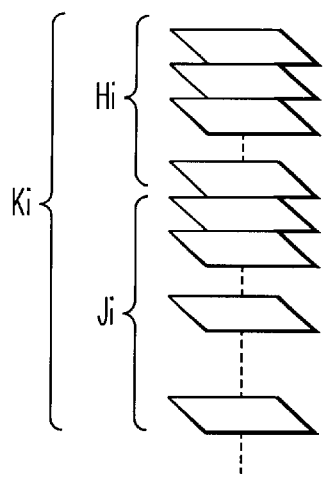
FIG. 15(a) is an illustration of showing multiple segmented images, the top portion of which are meshed or made semitransparent.

For mesh formation processing or semitransparency formation processing, as shown in FIG. 15, the segmented images in the Hi region (i.e., the images use by the endoscopic image preparation unit 16 to prepare the endoscopic image Ai) among the multiple segmented images Ki (i.e, the images loaded by the image data extraction unit 15 and used to construct the three-dimensional model) are meshed or become semitransparent. Consequently, the rear image Qi of the three-dimensional model derived from the segmented images Ji behind the segmented images Hi can be displayed.

Different techniques may be used to superimpose front and rear perspective images. Several such techniques are described in Foley et al., "Computerized Graphics, Principles and Practice, $2^{nd}$ edition," Addison-Wesley Publishing Company, revised $5^{th}$ printing, pp.754–759, which is incorporated by reference herein. Two examples of methods for superimposing front and rear perspective images are discussed below.

Images are usually colored with varying intensities of red, green, and blue (R/G/B) and supplied to an output device. By adding a transparency parameter "x" to information such as the R/G/B information, it is possible to determine the image transparency. For two-dimensional images, transparency is determined on each of two images, image A and image B. An image C which is a composite of images A and B can be expressed as $C=xA+(1-x)B$, where $0<=x<=1$ and A, B, and C refer to all the pixels which constitute image A, image B, and image C, respectively. When x=0, the image A is completely transparent, which means that only the image B is visible. Accordingly, if the image A is an image of an object behind another object represented by image B, none of the image A is displayed when x=0 and only the image A is displayed when x=1. If x=0.8, the image A of the rear object can be seen through the transparent image B of the front object.

Figure 15B:
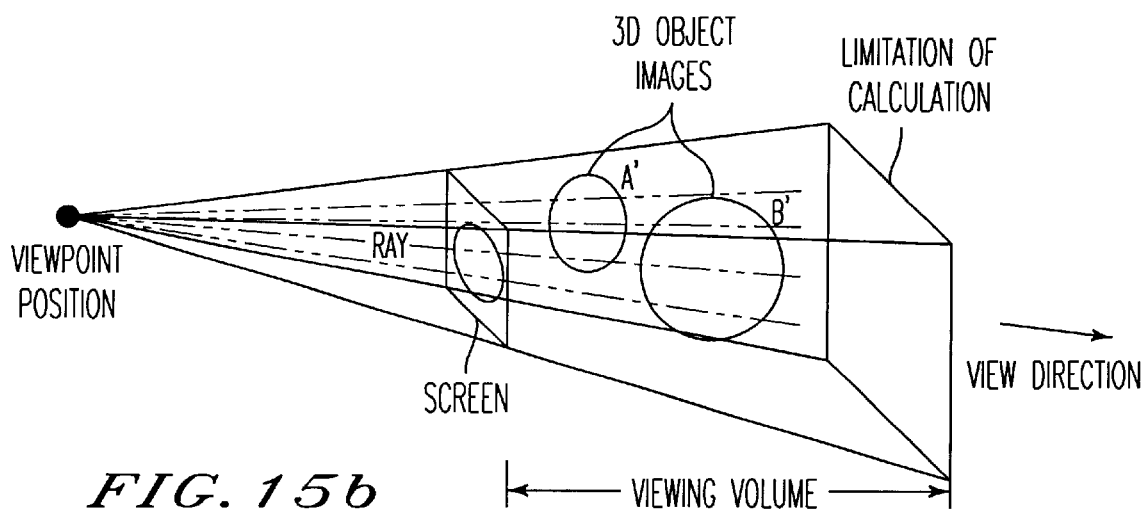
FIGS. 15(b) and 15(c) are illustrations showing two possible techniques for superimposing front and rear perspective images.

Referring to FIG. 15(b), the same principles apply to three-dimensional images which show the relation between a rear image A' and a front image B'. Each line radiated from a viewpoint position towards and through three-dimensional object images is called a ray. The number of rays depends on the resolution.

Voxel data of the image A' on each ray from a view point are used for calculation instead of a pixel value on one pixel location of the image A. Similarly, voxel data of the image B' on the same ray are used for calculation instead of a pixel value on the pixel location of the image B. When a plurality of three-dimensional object images are displayed, the transparency parameters are determined for each of the object images.

Figure 15C:
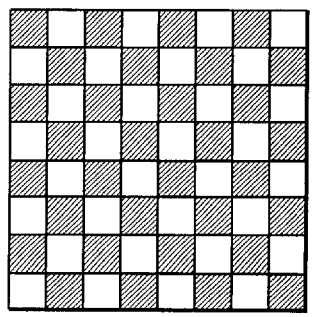

Referring now to FIG. 15(c), a second technique for superimposing the front and rear perspective images is called "masking." In this method, a masking image is prepared in addition to two images, A and B. The masking image has a particular pattern for determining which of the two images is allowed to be seen at each of the pixels. For example, a pattern as shown in FIG. 15(c) may be prepared. The black areas of the masking image allow only corresponding parts of the image A to be seen. Similarly, the white areas of the masking image allow only corresponding parts of the image B to be seen. By composing images A and B with the masking image, a composite image is obtained. By adjusting the pattern of the masking image, it is possible to change the degree to which one image may be seen through the other.

Current Value Processing

Figure 16:
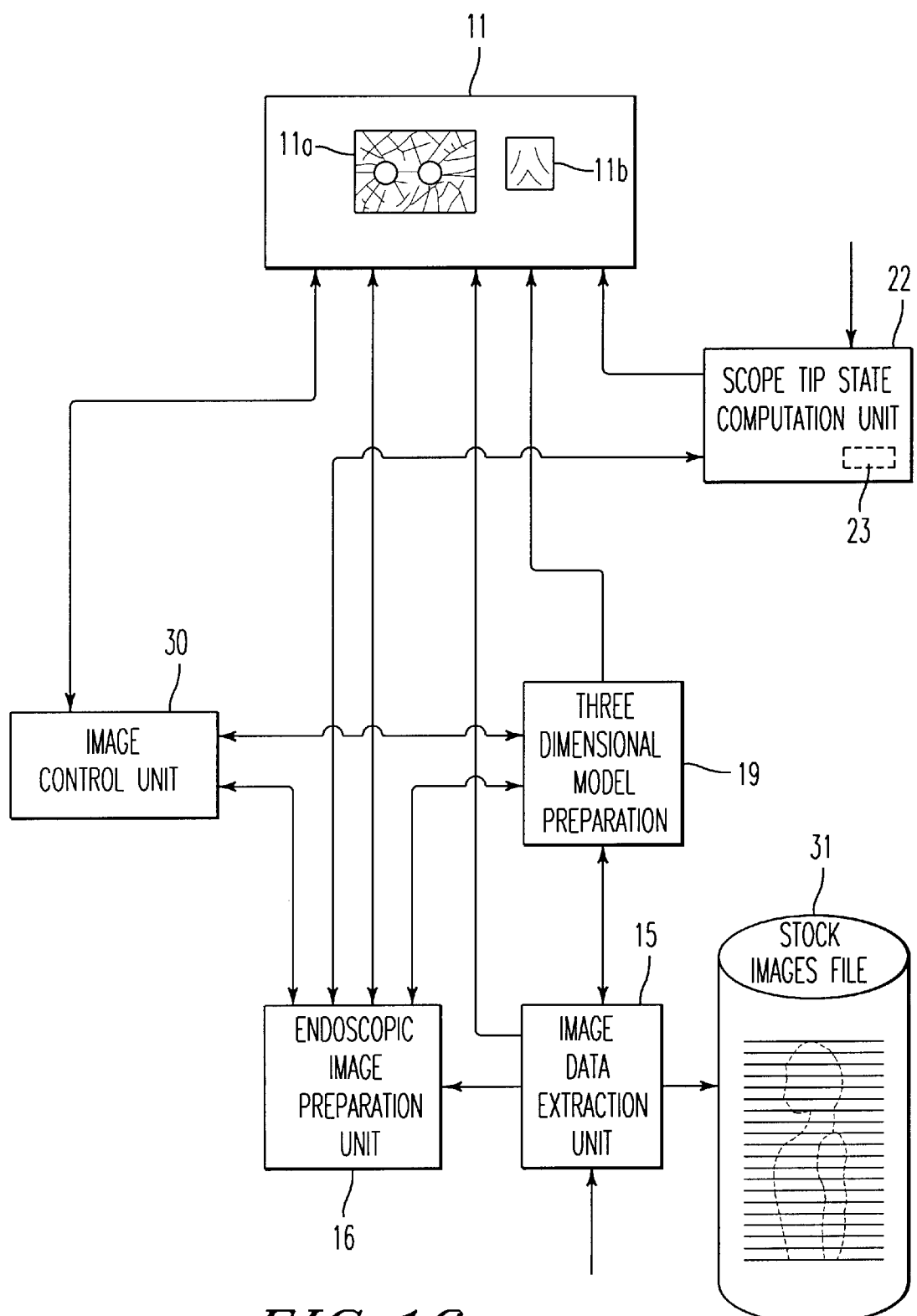
FIG. 16 is a schematic illustration showing the major components used for scope tip state computation.

FIG. 16 is a block diagram showing the major components used for current value computation processing.

The operator selects a general area of the subject's body for examination. The image data extraction unit 15 reads in stock images from the stock images file 31. The stock images are segmented images of the general area selected by the operator. A general area of interest within the subject 3a is selected on a stock image, allowing the segmented images of a desired site to be extracted. In this explanation, it will be assumed that the operator has selected the bronchial tubes of the subject 3a, although any tubular cavity or body part could be selected.

When the bronchial tubes are selected, the three-dimensional model preparation unit 19 collects stock images of the bronchial tubes and constructs a three-dimensional model from the stock images. The outer shape image preparation unit 32 installed in the endoscope tip state computation unit 21 prepares an outer shape image Bi to be displayed on the subdisplay 11b. This outer shape image Bi may be displayed as dot series data, for example, so that the indicator image Ci can be seen easily as shown in FIG. 4.

Further, the outer shape image preparation unit 32 permits the operator to rotate, enlarge, and/or reduce the outer shape image Bi by operating the mouse 12.

The endoscopic image preparation unit 16 prepares an endoscopic image Ai of the three-dimensional model of the bronchial tubes as seen from the viewpoint position and view direction. The endoscopic image Ai simulates a view of the three-dimensional model from a virtual endoscope. If the viewpoint position is outside the three-dimensional model, the endoscopic image Ai provides an external view of the three-dimensional model. Alternatively, if the viewpoint position enters the three-dimensional model, the endoscopic image Ai is an enlarged view of the interior of the three-dimensional model, i.e., the fly-through display. The endoscopic image preparation unit 16 can also display an endoscopic image Ai in directions and positions corresponding to the position of the cursor as a result of operating the mouse 12.

The endoscope tip state computation unit 22 determines the viewpoint position and the view direction of the endoscope tip from three-dimensional coordinates (X, Y, Z) of the virtual body made from the stock images collected by the endoscopic image preparation unit 16. At the same time, the position information of the body position direction memory unit 20 is read in. Based on the viewpoint position, view direction, and body position information, the endoscope tip state computation unit 22 determines the position of the indicator image Ci relative the outer shape image Bi, the view direction, and the reference direction. Next, the indicator image Ci is displayed in the subdisplay 11b as shown in FIG. 8, for example.

Further, when the viewpoint position or the view direction changes, the endoscope tip state computation unit 22 reads in an updated viewpoint position and view direction calculated by the endoscopic image preparation unit 16 and reads in updated body position information of the body position direction memory unit 20. Based on the updated viewpoint position, view direction, and body position information, an updated position of the indicator image Ci inside the outer shape image Bi of the subdisplay 11b is calculated and displayed. Alternatively, the indicator image Ci may be displayed on the subdisplay 11b after an endoscopic image Ai is displayed on the main display 11a.

Therefore, the operator viewing the displays 11a and 11b of the image processing system 8 can obtain visual images at selected positions, orientations, and view directions by simulated manipulation of an endoscope tip while comparing the endoscopic image Ai of the selected organ, the outer shape image Bi showing the external appearance of the selected organ, and the indicator image Ci revealing the orientation of the endoscopic image Ai relative to the selected organ and the virtual body.

Highlighting Specific Areas of Interest

When image processing systems are used in medical applications, it is helpful for the operator to be able to distinguish normal tissue from diseased or unhealthy tissue. As stated previously, the examination of the virtual human body with the image processing system 8 may be performed from within the selected organ. When inside the selected organ, a particular area of interest corresponding to a predetermined condition within the subject 3a may not be visible on the subdisplay 11b. For example, when the selected organ is a tubular cavity having a complicated structure, a predetermined condition in the subject 3a (such as a tumor or other nidus) may be hidden or indistinguishable from the surrounding tissue.

Figure 17:
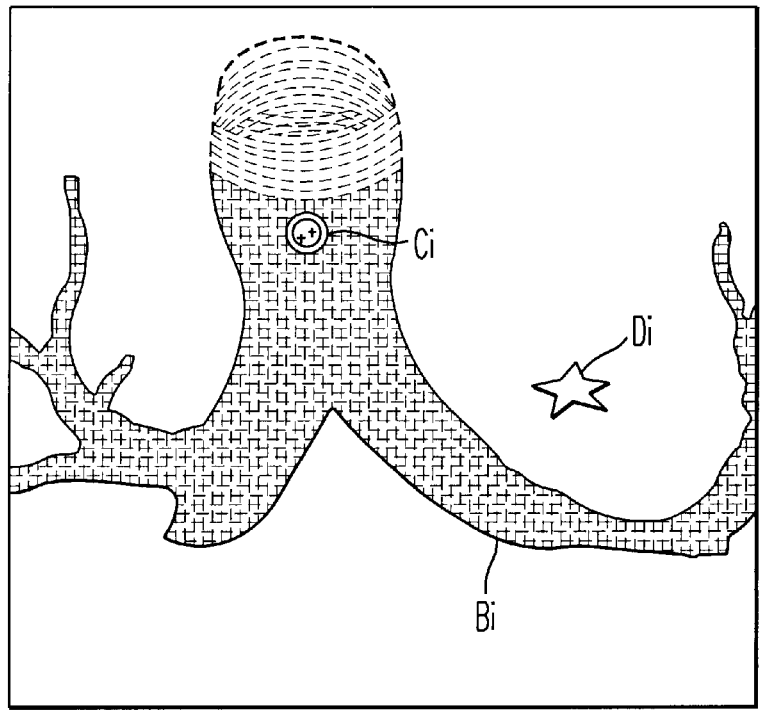
FIG. 17 is an illustration of a focus mark marking a particular area of interest on a three-dimensional model.

Therefore, the selected object preparation unit 18 reads in data for focus marks (e.g., stars and cubes), coordinates, and other related information pertaining to the particular area of interest from memory. When the outer shape image Bi is displayed on the subdisplay 11b, the selected object preparation unit 18 displays a focus mark Di at the coordinate position corresponding to the particular area of interest in the subdisplay 11b as shown in FIG. 17. Alternatively, a predetermined color and coordinate position of the particular area of interest stored in the color information memory unit 17 are read and displayed on the particular area of interest in the subdisplay 11b. In this manner, the particular area of interest can be easily distinguished from the surrounding tissue by making the color of the particular area of interest different from the color of the surrounding tissue. Particularly when a semitransparent or mesh display is used, the positions of normal tissue and diseased tissue can be found at a glance, and consequently, it is easier to determine the shortest route to a predetermined condition such as a tumor within the subject 3a.

Body Position Direction Compass

Figure 19:
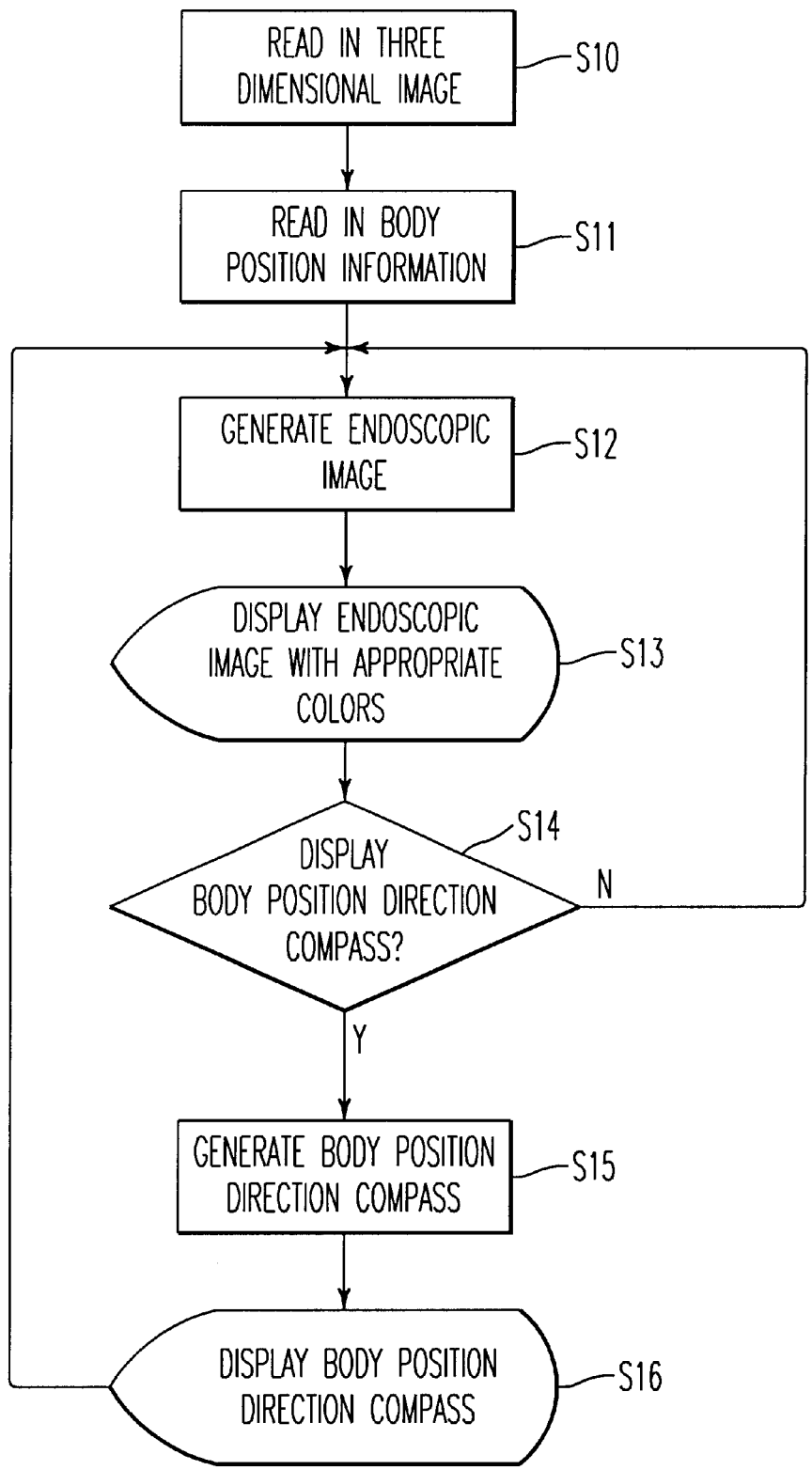
FIG. 19 is a flow chart explaining the generation of the body position direction compass.

FIG. 19 is a flow chart describing the main steps for the preparation of the body position direction compass image Mi. For purposes of simplifying the explanation, it will be assumed that a tubular cavity is being examined, although any blood vessel, organ, cavity, etc., could be used.

First in step S10, the image data extraction unit 15 reads in stock images which are stored in advance in the stock images file 31. Once the stock images of the selected area of the subject 3a are read in, the three-dimensional model preparation unit 19 reads in endoscopic display data corresponding to the visual field from the desired viewpoint position and view direction in the three-dimensional model. Next in step S11, the compass image preparation unit 21 reads in body position information from the body position direction memory unit 20.

Then, in step S12 the endoscopic image preparation unit 16 prepares an endoscopic image Ai of the three-dimensional model. Thereafter, in step S13 the image control unit 30 processes the endoscopic image Ai to provide the endoscopic image Ai with colors corresponding to the color information in the color information memory unit 17. Next, in step S14 the compass image preparation unit 21 determines if there is a body position direction compass image display command. If there is no such command in step S14, the process returns to the step S12 to display the endoscopic image Ai continuously.

If there is a command to display the body position direction compass image, the compass image preparation unit 21 determines the viewpoint position, view direction, and the directions of various body parts (e.g., left side, right side, feet, head, back, and chest) of the subject 3a relative to the endoscope tip based on the body position information in the body position direction memory unit 20. Next, the compass image preparation unit prepares a body position direction compass image Mi such as the one shown in FIGS. 20(a) through 20(f). Then, in step S16 the image control unit 30 processes the body position direction compass image Mi, and the body position direction compass image Mi is displayed on the endoscopic image Ai. Next, the process returns to step S12. As a result of steps S15 and S16, a body position direction compass image Mi, showing the orientation of the endoscope tip 2a relative to the directions of the respective parts of the subject 3a, is displayed on the endoscopic image Ai as shown in FIG. 21, for example.

FIGS. 20(a) through 20(f) show a body position direction compass image Mi in the shape of a sphere with a network pattern which gives the body position direction image Mi a three-dimensional appearance. Bars 24 project from the sphere at 90 degree angles to each other, indicating directions which are parallel and perpendicular to the body axial direction. For example, the bars 24 may point to the right side, left side, chest, back, head, and foot. The bars 24 may be labeled, respectively, with yellow labels L (indicating the direction of the subject's left side), R (indicating the direction subject's right side), A (indicating the direction of the subject's anterior side), P (indicating the direction of the subject's posterior side), H (indicating the direction of the subject's head), and F (indicating the direction of the subject's feet). The bars 24 may optionally be given colors that are different from one another. For example, the bars labeled A and P may be red, the bars labeled H and F may be green, and the bars labeled L and R may be blue. Additionally, the hemispheres from which the bars labeled F and H project may be displayed in different colors.

Figure 20A:
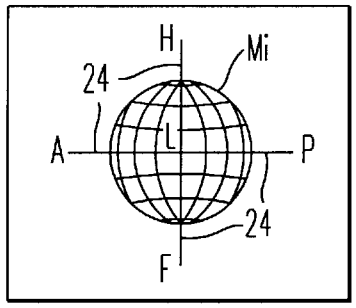
FIGS. 20(a) through 20(f) are illustrations of a spherical body position direction compass image.
Figure 20B:
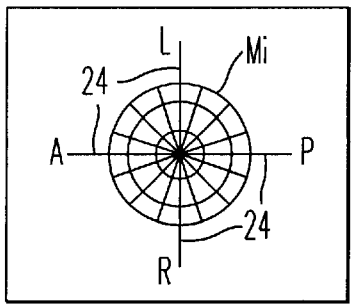
Figure 20C:
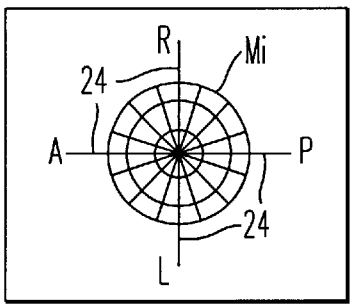
Figure 20D:
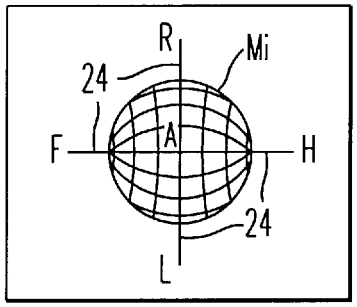
Figure 20E:
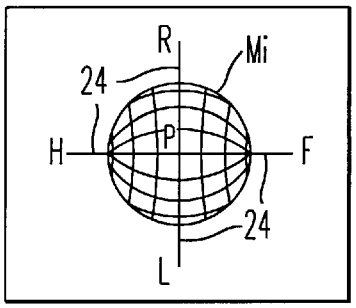
Figure 20F:
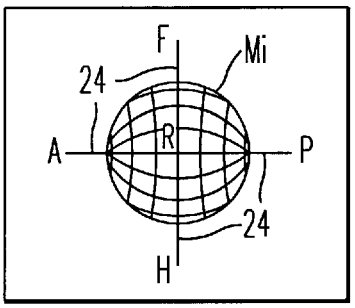

The body position direction compass image Mi informs the operator of the orientation of the virtual endoscope tip relative to the posture of the virtual body by indicating the directions parallel and perpendicular to the axial body direction on the endoscopic image Ai. FIG. 20(a) shows the body position direction compass image Mi when the view direction is in direction R, FIG. 20(b) shows a body position direction compass image Mi when the view direction is in direction H, FIG. 20(c) shows a body position direction compass image Mi when the view direction is in direction F, FIG. 20(d) shows a body position direction compass image Mi when the view direction is in direction P, FIG. 5(e) shows a body position direction compass image Mi when the view direction is in direction A, and FIG. 20(f) shows a body position direction compass image Mi when the view direction is in direction L.

Figures 22A, 22B:
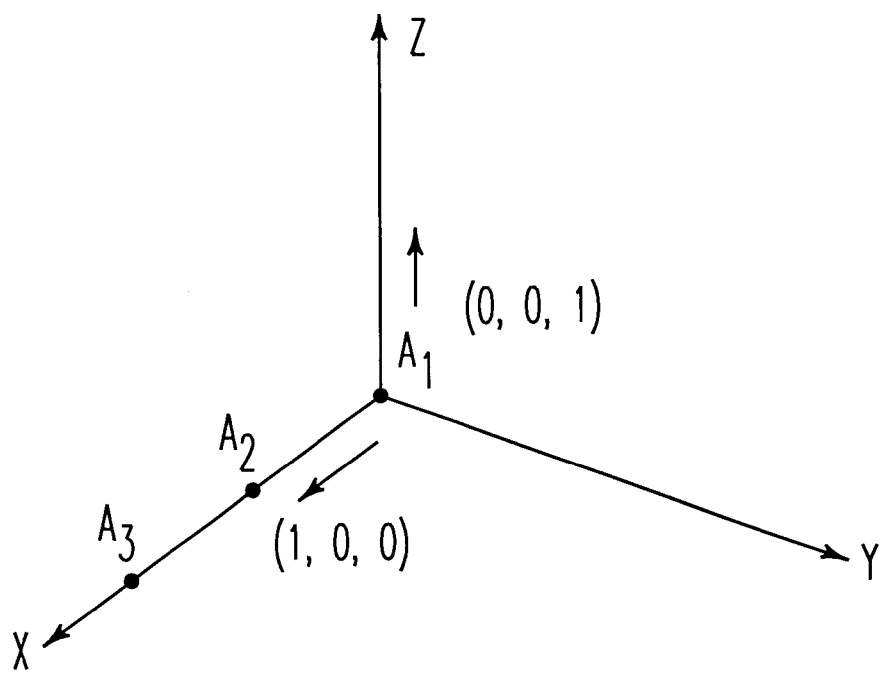
FIG. 22(a) is a table of viewpoint positions, view directions, and upward vectors.
FIG. 22(b) is an illustration showing the advancement of a viewpoint in a three-dimensional coordinate system.

To prepare a body position compass image Mi that indicates the posture of the virtual body relative to the orientation of the endoscope tip within the virtual body, the compass image preparation unit 21 performs the following operations. The compass image preparation unit 21 reads in the viewpoint position (X, Y, Z) and view direction (Dirx, Diry, Dirz) from the endoscopic image preparation unit 16 and stores the viewpoint position and the view direction in a table as shown in FIG. 22(a). The body position information is read in from the body position direction memory unit 20, and the upward vector (Upx, Upy, Upz) is calculated from the body position information, the viewpoint position, and the view direction. The upward vector is then stored as shown in FIG. 22(a). The upward vector indicates the degree to which the virtual endoscope tip has rotated about an axis defined by the view direction. From the upward vector, the directions of the right side, left side, chest, back, head, feet, etc., relative to the virtual endoscope tip are calculated, and the bars 24 are displayed in the appropriate directions.

For example in FIG. 22(b), the Z-axis is set as the axial body direction relative to which the different body part directions of the subject are to be determined. The coordinates of the viewpoint position and view direction are defined on the three-dimensional coordinate axes. The upward vector to the axis Z is determined as shown in FIG. 22(a). FIG. 22(b) shows an example of the viewpoint position being advanced from A1 to A2 to A3. When the viewpoint position is advanced, the compass image preparation unit 21 determines the relation of the body position direction compass image Mi based on the stored viewpoint position (X, Y, Z), view direction (Dirx, Diry, Dirz), and the upward vector (Upx, Upy, Upz), and adds labels (L, R, A, P, H and F) to the appropriate bars 24.

As described above, the body position direction compass image Mi as shown in FIGS. 4 and 21, for example, indicates the directions parallel and perpendicular to the axial body direction of the subject 3a. In this manner, the operator can discern the direction in which he or she is looking relative to the axial body direction of the virtual body, making it easier to advance an actual endoscope tip 2a accurately, safely, and smoothly.

As shown in FIGS. 11 and 13, the body position direction compass image Mi can be displayed on an endoscopic image Ai which is meshed or semitransparent. For a mesh display, the compass image preparation unit 21 reads in the viewpoint position (X, Y, Z) and view direction (Dix, Diy, Diz) from the endoscopic image preparation unit 16 when there is a command requesting a compass image display on a meshed endoscopic image Ai. Subsequently, the body position information stored by the body position direction memory unit 20 is read in, and the directions of the right side, left side, chest, back, head, and feet relative to the virtual endoscope tip are determined from the body position information and the upward vector. From these directions, the compass image preparation unit 21 determines the orientation of the body position direction compass image Mi and adds labels (L, R, A, P, H and F) to the appropriate bars 24. FIG. 11 shows a body position direction compass image Mi displayed over the meshed endoscopic image Ai. The rear image Qi of the previously hidden portions of the three-dimensional object is revealed, and, at the same time, the orientation of the virtual endoscope tip relative to the axial body direction of the virtual human subject is readily discernable by the operator.

When a command requesting a body position compass image display is received while a semitransparent endoscopic image Ai is being displayed, as shown in FIG. 13, the compass image preparation unit 21 reads in the viewpoint position (X, Y, Z) and the view direction (Dix, Diy, Diz) from the endoscopic image preparation unit 16. Subsequently, the body position information stored by the body position direction memory unit 20 is read in, and the directions of the right side, left side, chest, back, head, and feet relative to the virtual endoscope tip are determined from the body position information and the upward vector. The compass image preparation unit 21 determines the orientation of the body position direction compass image Mi and adds labels (L, R, A, P, H and F) to the bars 24, respectively. FIG. 13 shows a body position direction compass image Mi, indicating the orientation of the virtual endoscope tip relative to the axial body direction of the virtual human subject, over a semitransparent endoscopic image Ai. The rear image Qi of the previously hidden portions of the three-dimensional object is revealed, and the position of the virtual endoscope tip relative to the axial body direction is readily ascertained by the operator.

Figure 20G:
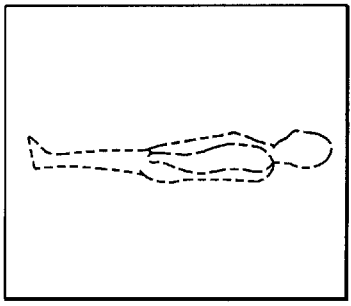
FIG. 20(g) is an illustration of a body position direction compass image having the shape of a human body.
Figure 20H:
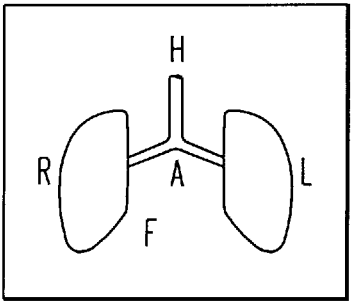
FIG. 20(h) is an illustration of a body position direction compass image having the shape of the lungs, bronchi, and trachea.

The body position direction compass image Mi has been described as a three-dimensional image of a sphere with a network pattern. However, the body direction compass image can have any appearance which indicates the orientation of the virtual endoscope tip relative to the virtual subject or a part of the virtual subject. For example, the body position direction compass image Mi may be a three-dimensional radial shape, the shape of the subject 3a (FIG. 20(g)), or the shape of an organ or group of organs such as the lungs, bronchi, and trachea (FIG. 20(h)). If an organ is used, the body position direction compass image Mi may be in the shape of the organ being examined so that control of the virtual endoscope tip becomes more intuitive.

View Direction Changes

Figure 23:
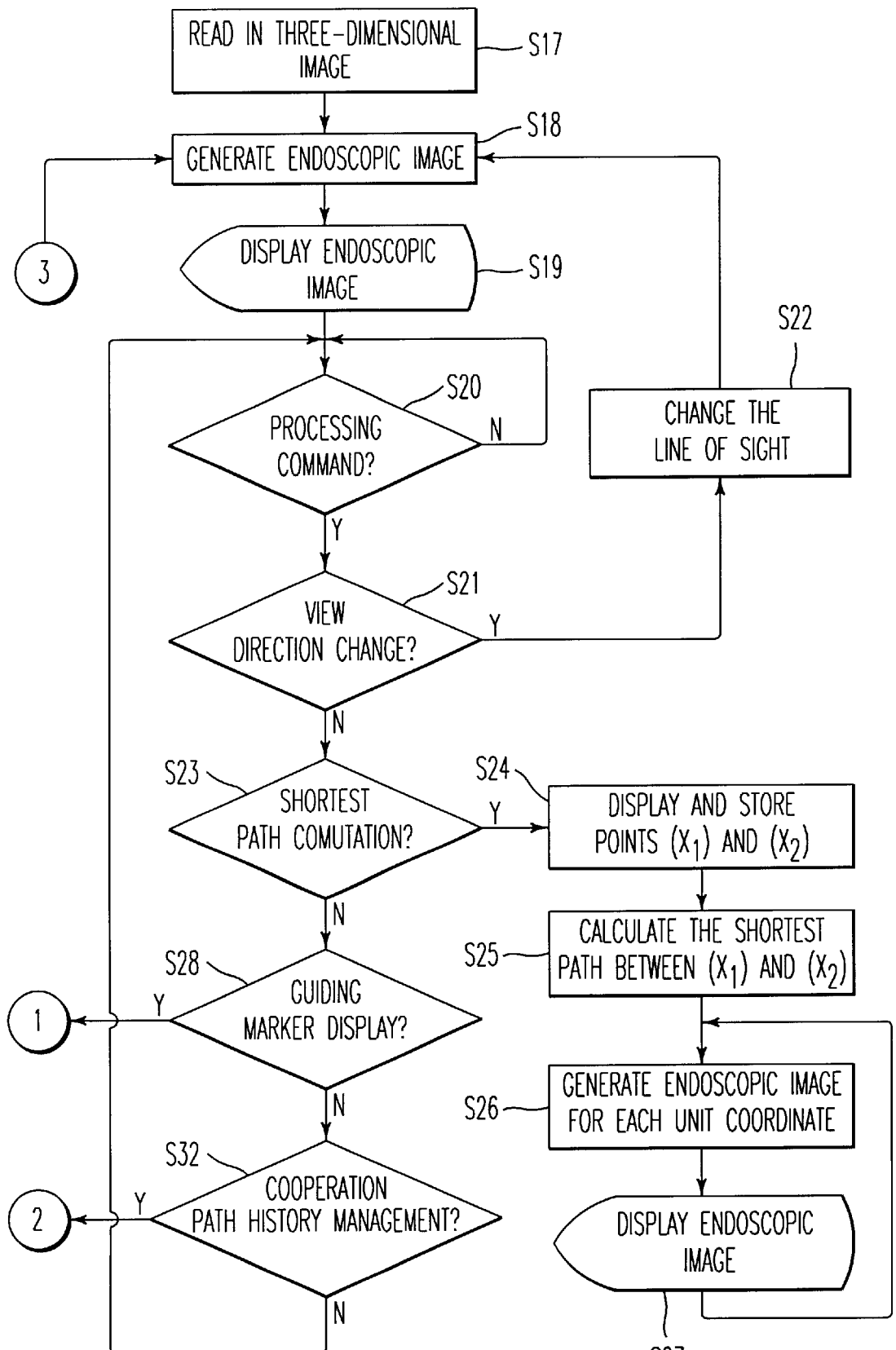
FIGS. 23 and 24 are flowcharts showing the operation of various display functions.
Figure 24:
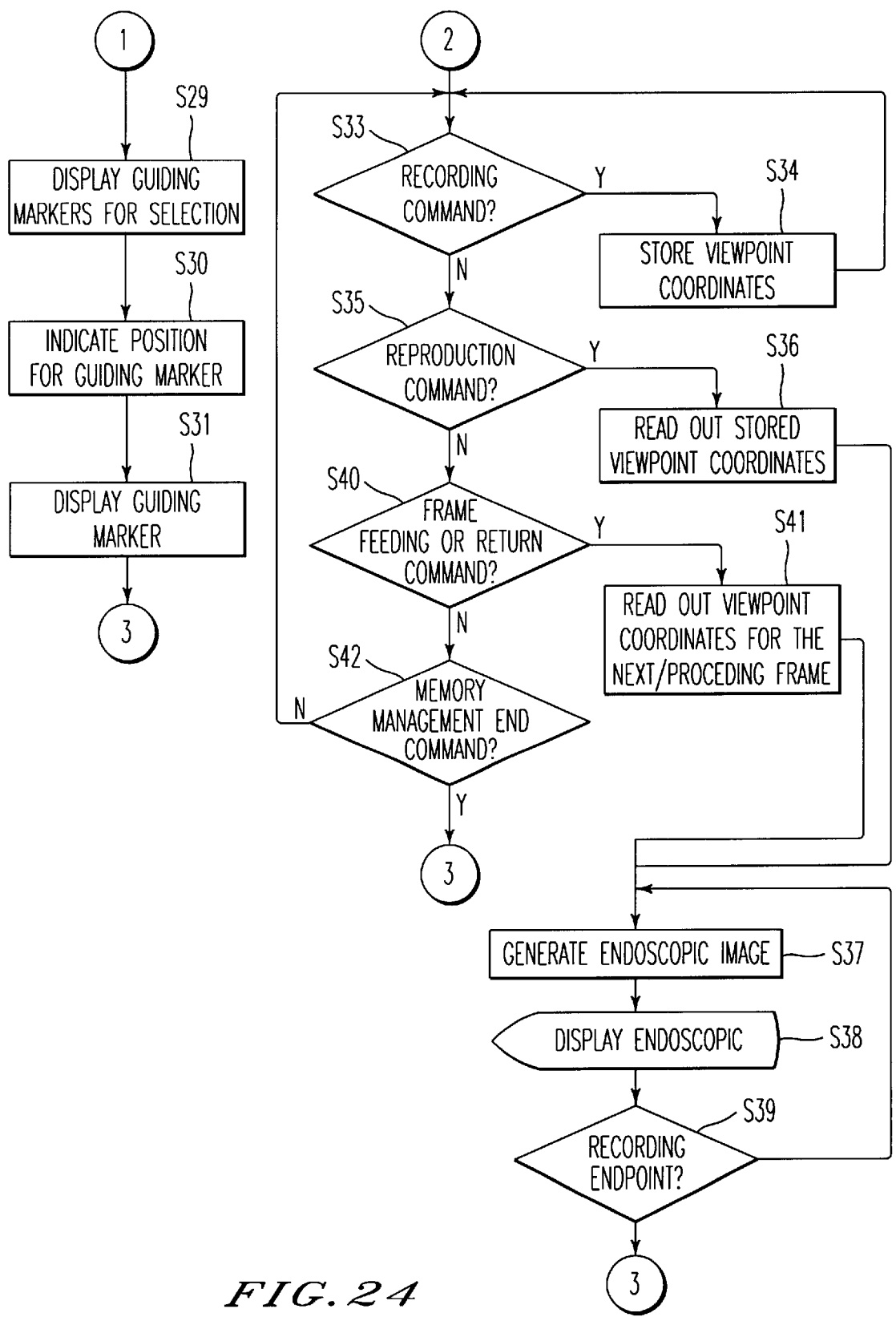
Figure 25B:
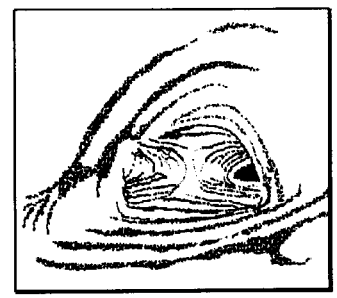
FIGS. 25(a) through 25(e) are illustrations showing changes in the endoscopic image resulting from shifts in the viewpoint position.
Figure 25A:
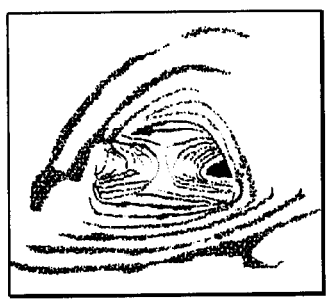
Figure 25C:
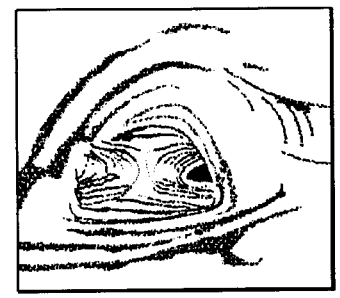
Figure 25D:
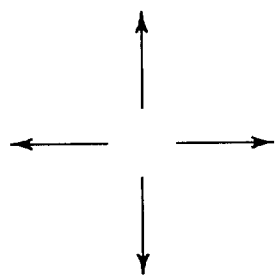
Figure 25D:
Figure 25E:
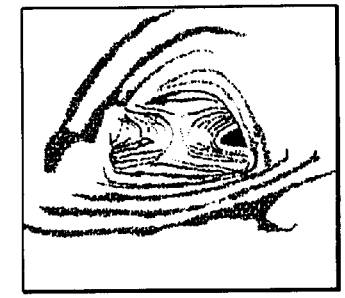

FIGS. 23 and 24 are flow charts explaining various image changes including changes to the view direction.

The image data extraction unit 15 reads in the stock images from the stock images file 31. Once the stock images of the region of the body which is to be examined are read in, the three-dimensional model processing unit 19 forms a three-dimensional model based on the stock images. In step S17 the endoscopic image preparation unit 16 reads in endoscopic display data corresponding to the viewpoint position and view direction relative to the three-dimensional model. The read in of endoscopic display data 16 is initiated by the operation of the mouse.

In step S18 the endoscopic image preparation unit 16 processes the endoscopic display data to prepare an endoscopic image Ai, corresponding to the viewpoint position, the view direction, and orientation of the endoscope. Then, in step S19 the image control unit 30 processes the endoscopic image Ai, and the endoscopic image Ai is displayed on the main display 11a.

Next, in step S20 the input unit 14 determines whether or not a processing command has been generated by the operation of the mouse 12, keyboard 13, or toolboxes 11(c) through (e). If a processing command has occurred in step S20, in step S21 the input unit 14 determines whether or not the event is a command to change the view direction, i.e., whether one of the keys shown in FIG. 6(b) has been activated. If there is a command to change the view direction in step S21, the input unit 14 initiates operation of the image moving and rotating unit 26. The image moving and rotating unit 26 decides if the view direction change is caused by the activation of key 11d1 to turn the view direction ninety degrees to the left, key 11d2 to turn the view direction ninety degrees to the right, key 11d3 to turn the view direction ninety degrees upwards, key 11d4 to turn the view direction ninety degrees downwards, or key 11d5 to turn the view direction completely around, one hundred eighty degrees. Then, in step 22 the process then returns to step S18.

The image moving and rotating unit 26 determines three-dimensional coordinates of the viewpoint position and the view direction within the three-dimensional model when a key in the image movement and rotation toolbox 11d is activated. These coordinates are fed to the endoscopic image processing unit 16 where an updated image reflecting the change in the view direction is prepared. The updated image is displayed in the main display 11a.

Other image movement and rotation features may be added as well. Referring now to FIGS. 25(a) through 25(e), an endoscopic image such as that shown in FIG. 25(a) may be changed as the result of sliding the viewpoint position left (FIG. 25(b)), right (FIG. 25(c)), up (FIG. 25(d)), or down (FIG. 25(e)) without changing the view direction. An operator can slide the viewpoint position in this manner by selecting specified keys on the keyboard (e.g., the left, right, up, and down arrow keys) and/or on a toolbox (not shown) on the display unit 11.

Referring now to FIGS. 26(a) through 26(c), an endoscopic image Ai such as the one shown in FIG. 26(a) may be rotated to the left (FIG. 26(b)) or to the right (FIG. 26(c)). An operator can rotate endoscopic images in this manner by selecting specified keys on the keyboard and/or on a toolbox (not shown) on the display unit 11.

Shortest Path Computation

Referring back to FIG. 23, if no viewpoint position command has occurred in step S21, then, in step S23 the input unit 14 determines whether or not there is a shortest path computation command, i.e., whether key 11e2 (FIG. 6(a)) has been activated. If a shortest path computation command has occurred in step S23, the input unit 14 initiates processing in the shortest path computation unit 27. Next, in step S24 the shortest path computation unit 27 indicates a first point X1 and a second point X2, designated by the operator, on the outer shape image Bi as shown in FIG. 27 and stores the three dimensional coordinates of these points.

Next, in step S25 the shortest path connecting the first point X1 and second point X2 is determined on the three-dimensional model, and the image control unit 30 processes the straight line connecting the two points for display on the subdisplay 11b as shown in FIG. 27. In step S26 the viewpoint position may be moved along this straight line while the endoscopic image preparation unit 16 prepares updated endoscopic images Ai as a result of the movement. Then, in step S27 the updated endoscopic images are consecutively displayed on the main display 11a so that the operator can see the movement. Steps S26 and S27 are repeated at each unit coordinate from the first point X1 to the second point X2.

Guiding Marker Display

Figure 28A:
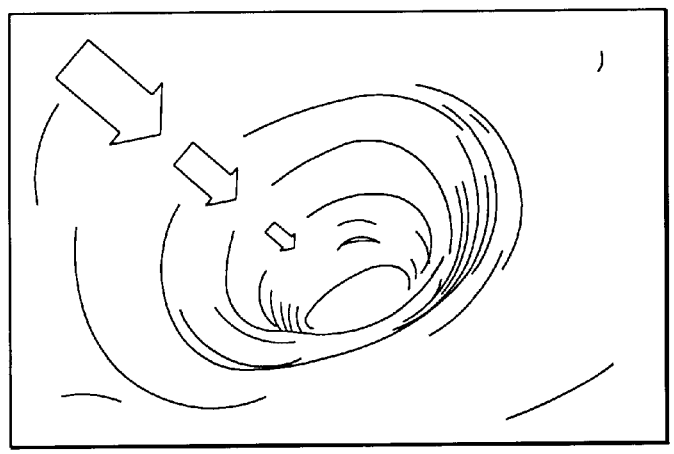
FIG. 28(a) is an illustration of three-dimensional guiding markers on an endoscopic image.
Figure 28B:
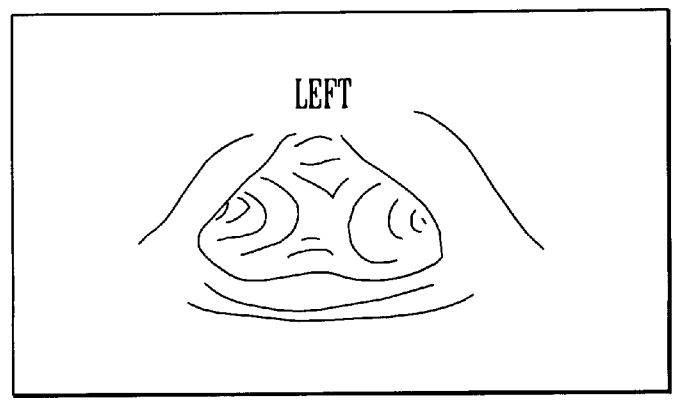
FIG. 28(b) is an illustration of a guiding marker composed of characters.

If a shortest path computation command has not occurred step S23, then, in step S28 the input unit 14 determines whether or not there is a guiding marker display command (also called 3-D annotation). If there is a command for a guiding marker display in step S28, next, in step S29 the guiding marker preparation unit 25 displays guiding markers stored in memory (e.g., right direction arrows, left direction arrows, Xs indicating no entrance, up direction arrows, down direction arrows, optional direction arrows, and characters) on the display unit 11 for selection by the operator. In step S30 the position where the guiding marker is to be displayed is indicated on the endoscopic image Ai with the cursor, for example, and an endoscopic image Ai with the guiding marker is prepared. Next, in step S31 the image control unit 30 prepares the endoscopic image Ai with the guiding marker in the desired position, and the endoscopic image Ai is displayed with the guiding marker in the desired position before the process is returned to step S18. As shown in FIG. 28(a), the guiding markers are displayed three-dimensionally on the endoscopic image Ai to help the operator advance a real or virtual endoscope. Also, the guiding markers may be composed of characters to indicate a body part, a name, or a direction to follow as shown in FIG. 28(b). In this manner, portions of the three-dimensional model can be labeled.

In FIG. 18, the tubular cavity in which to advance the endoscope tip 2a is marked with guiding markers Y1 and Y2. The tubular cavity in which the endoscope tip 2a is not to be advanced is marked with an X-shaped guiding marker Y3. In this manner, when either a virtual or actual endoscope tip is advanced, the guiding markers help the operator steer the tip. The guiding markers are particularly helpful when the operator must navigate the actual endoscope tip 2a through a complicated branch in the subject 3a.

Figure 29:
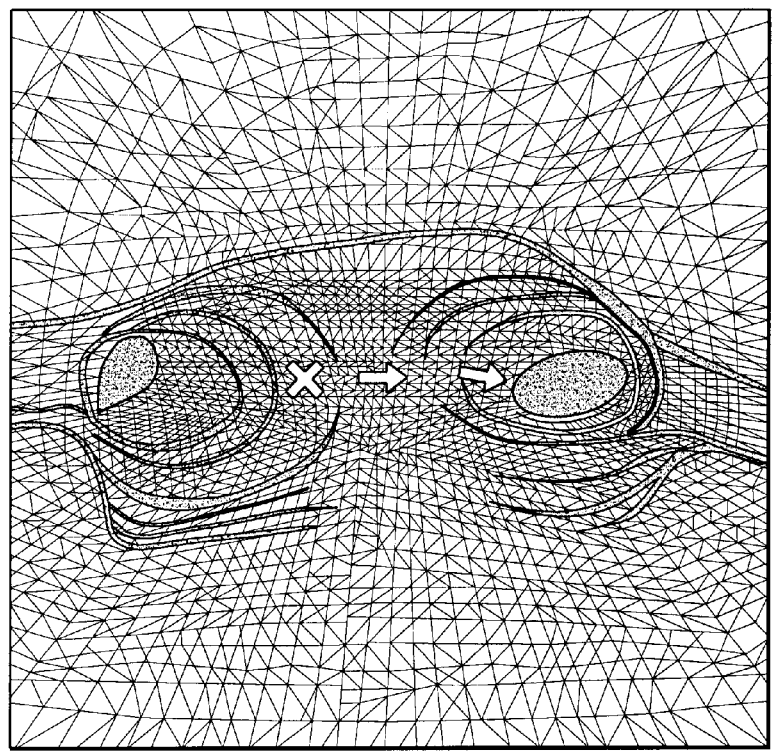
FIG. 29 is an illustration of guiding markers on a meshed endoscopic image.
Figure 30:
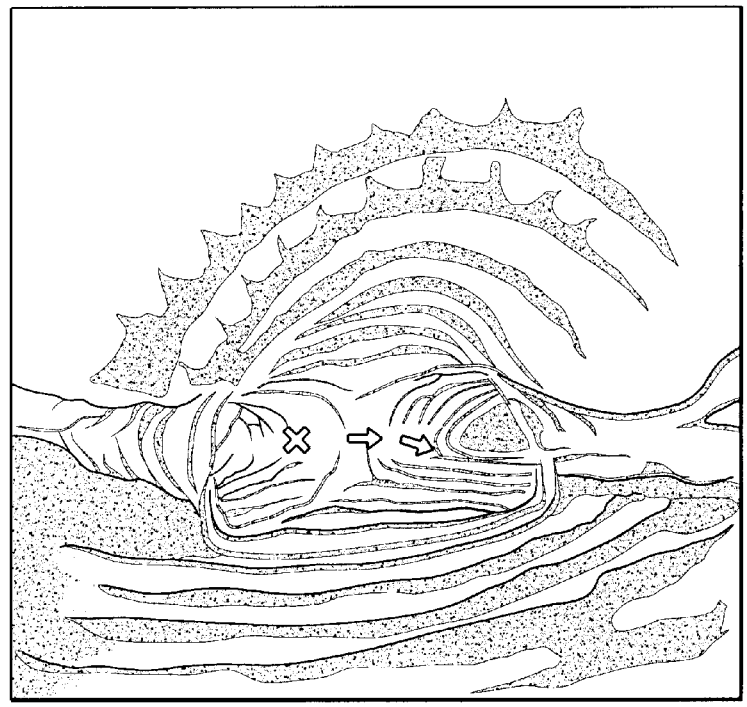
FIG. 30 is an illustration of guiding markers on a semitransparent endoscopic image.
Figure 31:
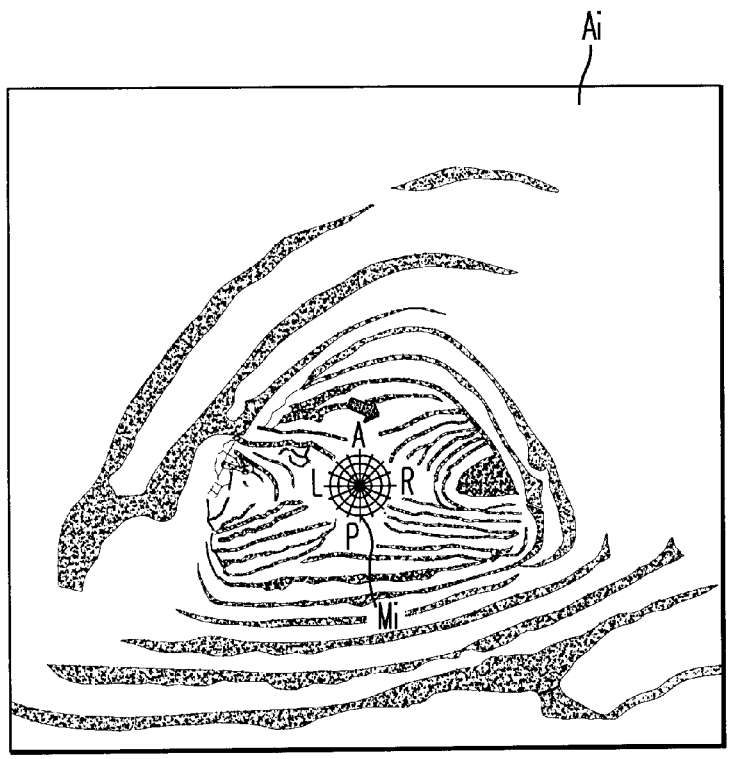
FIG. 31 is an illustration showing both a body position direction compass image and guiding markers together on an endoscopic image.
Figure 32:
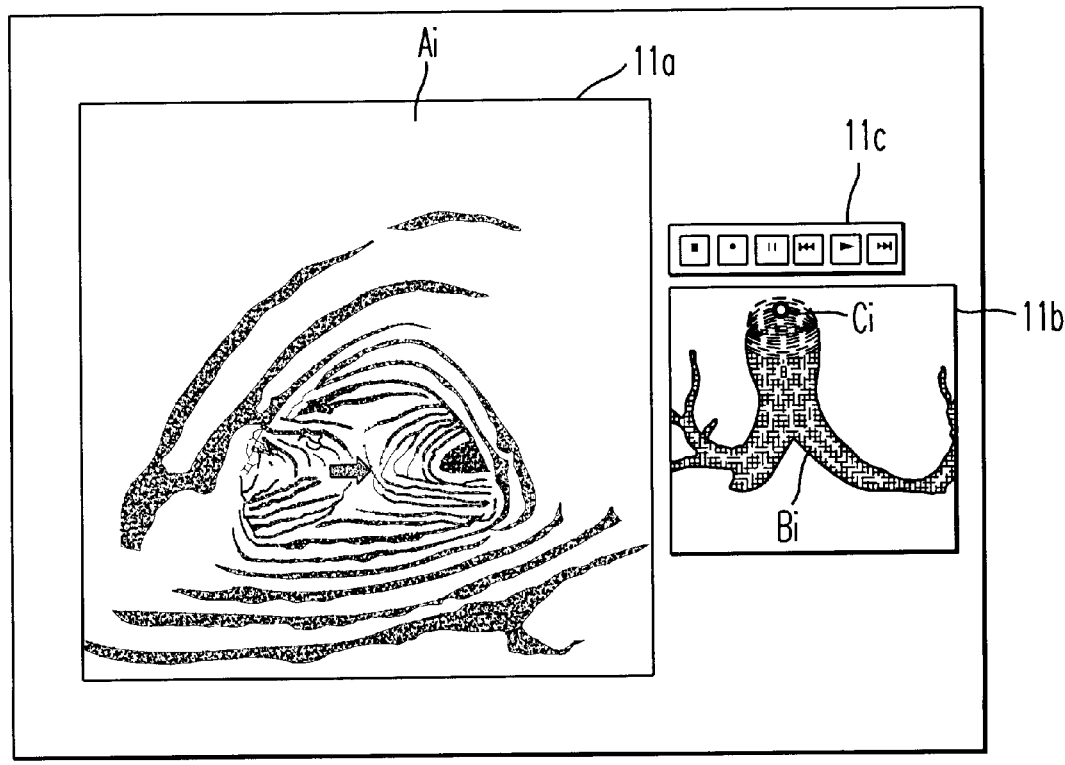
FIG. 32 is an illustration of a monitor screen having a main display with guiding markers on an endoscopic image, a subdisplay with an indicator image on an outer shape image, and an operation path toolbox.

When guiding markers are displayed, the endoscopic image Ai may be a mesh image or a semitransparent image as shown in FIGS. 29 and 30. The body position compass image Mi may also be displayed at the same time as the guiding markers as shown in FIG. 31. Additionally, the scope tip state image Ci may be displayed adjacent to the outer shape image Bi on the subdisplay 11b, as shown in FIG. 32.

When a body position direction image Mi is displayed over mesh or semitransparent images Ai and previously hidden portions Qi of the three dimensional model, guiding markers may be displayed on the endoscopic image Ai. For example, in the image processing system 8, the guiding marker preparation unit 25 displays guiding markers on the display when there is a guiding marker display command after the endoscopic image Ai is meshed by the mesh formation unit 23 and after one of the displayed markers is selected. Using the mouse, the operator positions the cursor to indicate where the guiding marker is to be displayed on the endoscopic image Ai. The endoscopic image Ai with the guiding marker is prepared, and the image control unit 30 processes the guiding marker for display at the desired position on the endoscopic image Ai. As shown in FIG. 30, a guiding marker to lead the endoscope tip 2a is displayed on the meshed endoscopic image Ai.

Also, the guiding marker preparation unit 25 can prepare guiding markers for display on the endoscopic image Ai after the endoscopic image Ai is made semitransparent by the semitransparency formation unit 24 and after one of the markers is selected. The user places the cursor in the position where the guiding marker is to be displayed on the endoscopic image Ai. The endoscopic image Ai with the guiding marker is prepared, and the image control unit 30 processes the guiding marker for display at the position on the endoscopic image Ai. As shown in FIG. 30, a guiding marker to lead the tip of the endoscope 2 is displayed on the semitransparent endoscopic image Ai.

If there is a command requesting a body position direction compass image Mi, the compass image processing unit 21 reads in the viewpoint position (X, Y, Z) and the view direction (Dix, Diy, Diz) determined by the endoscopic image processing unit 16. The body position information stored in the body position direction memory unit 20 is also read, and based on the body position data, viewpoint position, and view direction, the orientation of the endoscope tip 2a to the axial body direction is determined. As described above in discussing the preparation of the body direction compass image, labels (L, R, A, P, H and F) are added to the bars 24. FIG. 31 shows a body position direction compass image Mi indicating the orientation of the endoscope tip 2a relative to the subject 3a with guiding markers displayed on the endoscopic image Ai. The orientation of the endoscope tip 2a relative to the axial body direction of the subject 3a is discernable, and the direction to advance the endoscope tip is displayed.

Operation Path History Management

If no guiding marker display command has occurred in step S28, then in step S32 the input unit 14 determines whether or not an operation path history management command has occured. If an operation path history management command has occurred, the images corresponding to the paths through which the virtual endoscope has moved may be recorded and replayed in a manner similar to a videotape recorder. This is performed by regenerating the past images using stored sequences of past viewpoint positions, view directions, and reference directions. The operation path history management unit 28 determines whether or not the command is a recording command event S33, i.e., whether or not the key 11c2 of the operation path history toolbox 11c of FIG. 6(c) has been selected.

If a recording command has not occurred in step S33, next, in step S34 the three-dimensional coordinates through which the viewpoint has passed are successively stored, and the process is returned to step S33. For example, the viewpoint positions for the coordinates along the shortest path between two points may be stored.

If a recording command is found not to have occurred in step S33, next, in step S35 the operation path history control unit 28 determines whether or not a reproduction command has occurred, i.e, whether or not key 11c5 of the operation path history toolbox 11c has been activated. If a reproduction command has occurred in step S35, in step S36 the three-dimensional coordinates of the passed viewpoints stored in step S34 are successively read out. The three-dimensional coordinates read-out are successively output to the endoscopic image preparation unit 16. For each coordinate position, in step 37 the endoscopic image preparation unit 16 prepares an endoscopic image Ai. Then, in step S38 the endoscopic image Ai is displayed on the main display 11a. Then, in step S39 the operation path history management unit 28 determines whether or not the recording endpoint has occurred. If the recording endpoint has not occurred in step S39, processing is returned to step S37, and the endoscopic image Ai for the next three-dimensional coordinates is displayed. If the recording endpoint is reached, the process returns to step S18 of FIG. 23, and the first endoscopic image Ai is displayed in step S19.

Figure 6C:
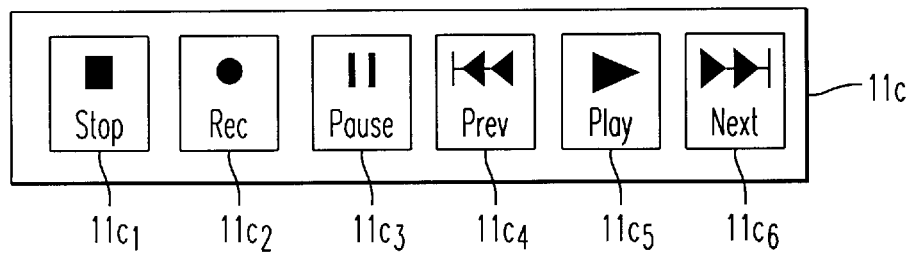

If no reproduction command has occurred in step S35, in step S40 the operation path history management unit 28 determines whether or not there is a frame advance or a frame return command, i.e., whether or not the key 11c3 or 11c4 of the operation path history toolbox 11c of FIG. 6(c) has been activated. If a frame advance or frame return command has occurred in step S40, then in step S41 the three-dimensional viewpoint coordinates of the frame succeeding or preceding, respectively, the current frame are read out. The endoscopic image formation unit 16 prepares the appropriate endoscopic image Ai, and the process precedes to step S37.

If a frame feeding or return command has not occurred in step S40, then in step S42 the operation path history control unit 28 determines whether or not a memory management end command has occurred, i.e, whether or not the key 11c1 of the operation path history toolbox 11c in FIG. 6(c) has been activated. If a memory management end command has not occurred, the process returns to step S23. If the memory management end command has occurred, the process returns to step S18, and the first endoscopic image Ai is displayed.

Two Endoscopic Devices

Figure 33:
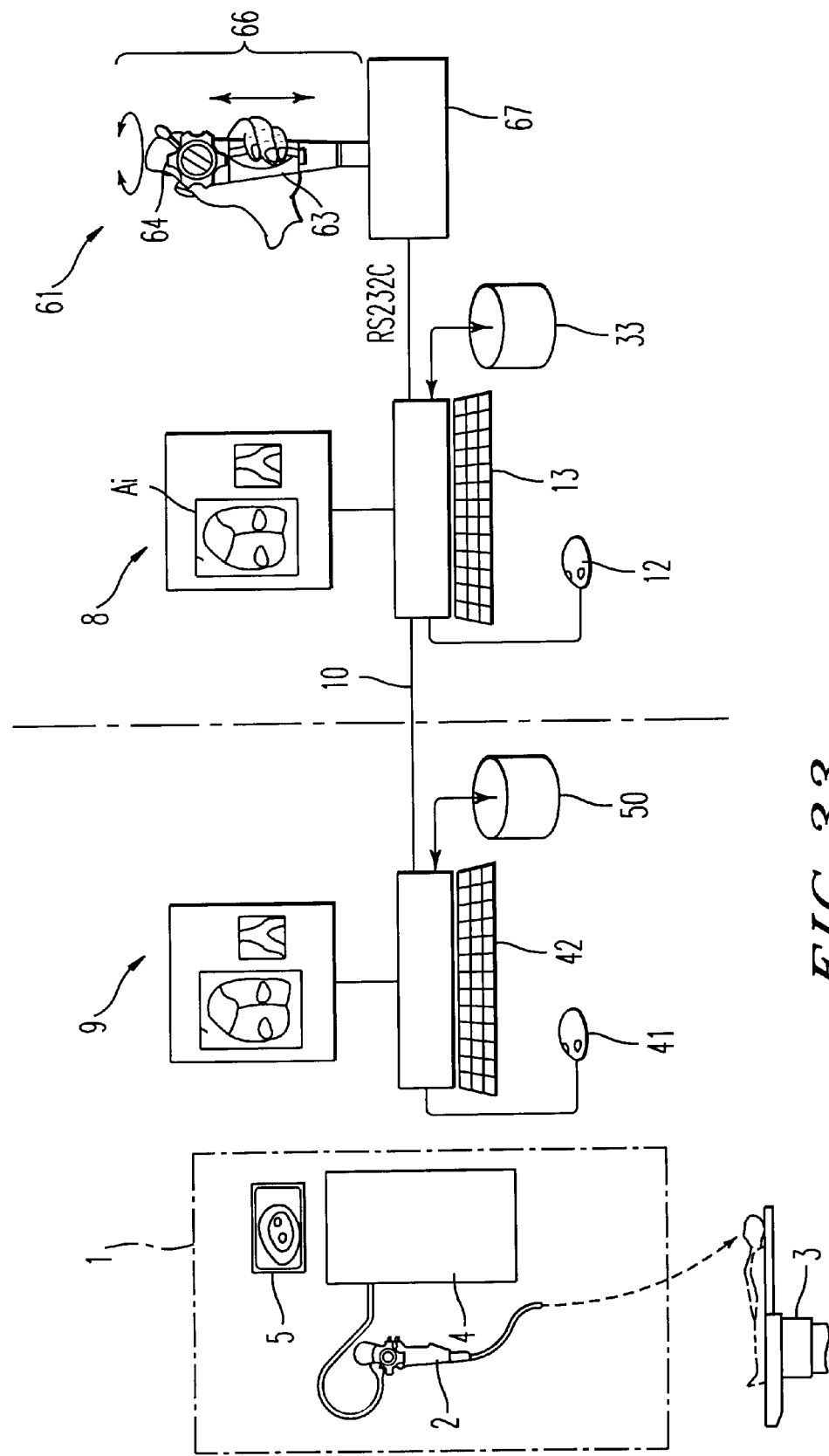
FIG. 33 is a schematic illustration of an image processing system in a simulation room connected to an image processing system in an endoscopic examination room.

FIG. 33 shows a second image processing system 9 in an endoscopic examination room used in conjunction with the image processing system 8, discussed above. The image processing system 8 may be installed in a simulation room and is connected to the second image processing system 9 via a local area network (LAN) 10. Endoscopic guide data prepared by the image processing system 8 may be transferred to the second image processing system 9 via the LAN. The endoscopic guide data may include any data or images prepared or stored in the first image processing system 8. In this manner the second image processing system 9 can access and display images based on the endoscopic guide data transferred from the first image processing system 8.

Figure 34:
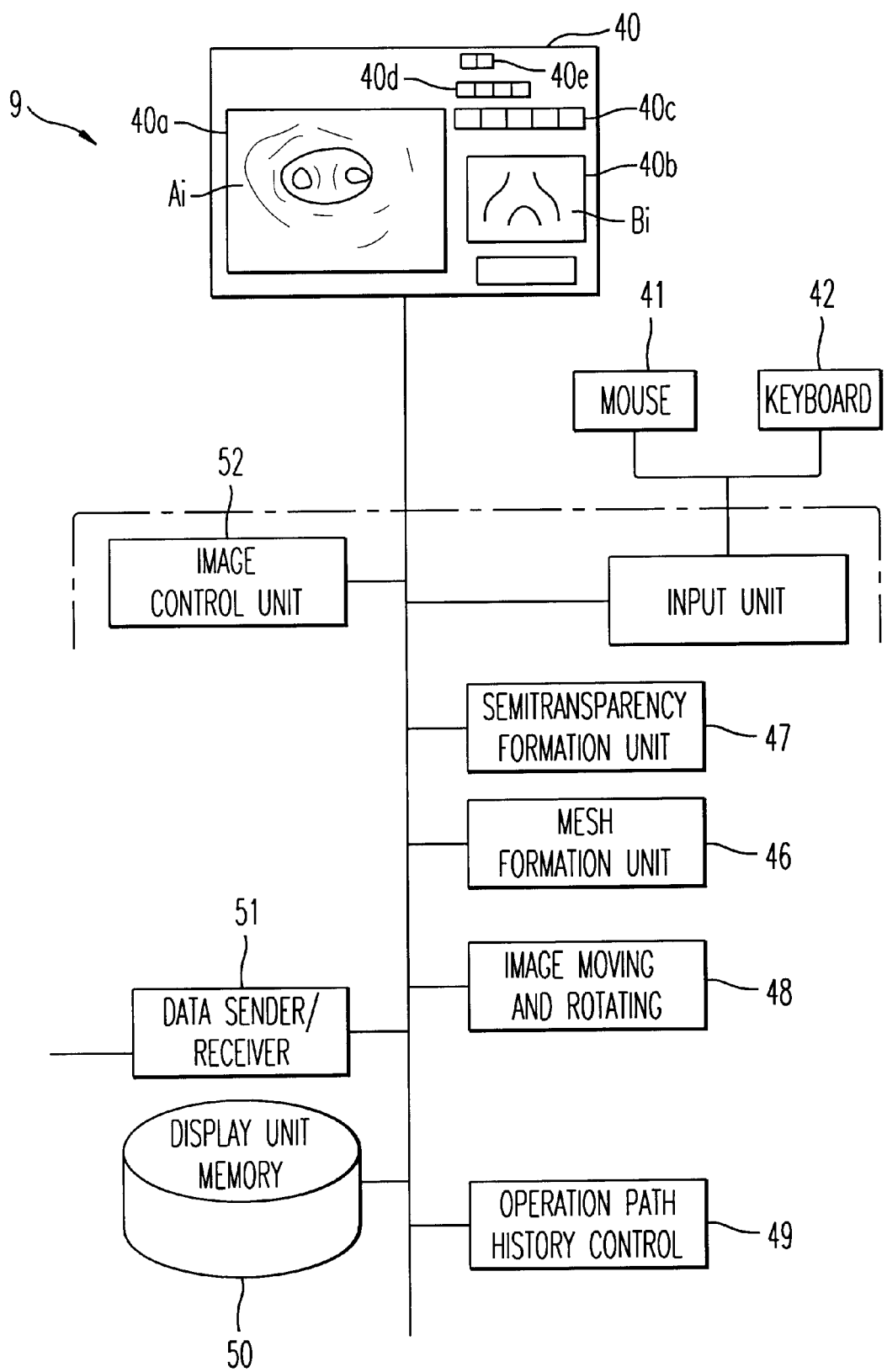
FIG. 34 is a schematic illustration of an image processing system in an endoscopic examination room.

FIG. 34 is a block diagram of the second image processing system 9 in the endoscopic examination room. The second image processing system 9 operates in the same manner as the image processing system 8, and therefore contains many of the same components. The second image processing system 9 may also be configured identically to the image processing system 8. The second image processing system 8 has the following components: a display unit 40, an input unit 43 with a mouse 41 and a keyboard 42 connected, a mesh formation unit 46, a semitransparency formation unit 47, an operation path history control unit 49, a display unit memory 50, a data sending and receiving unit 51, and an image control unit 52.

Figure 35A:
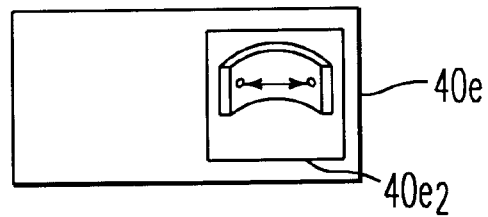
FIGS. 35(a) through 35(c) are illustrations of the toolboxes for an image processing system in an endoscopic examination room.
Figure 35B:
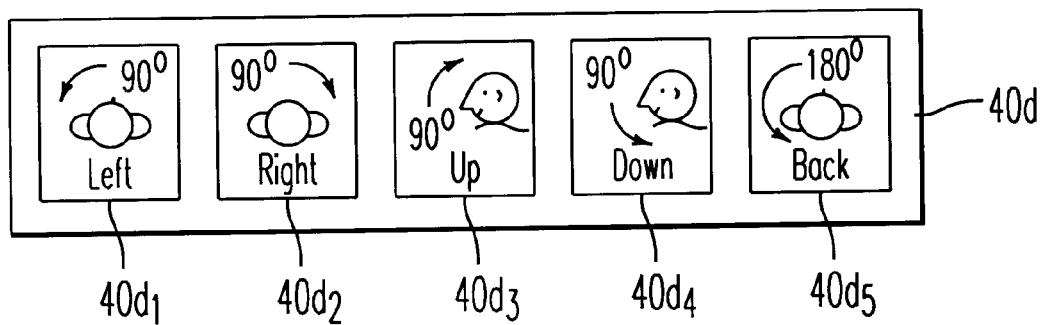
Figure 35C:
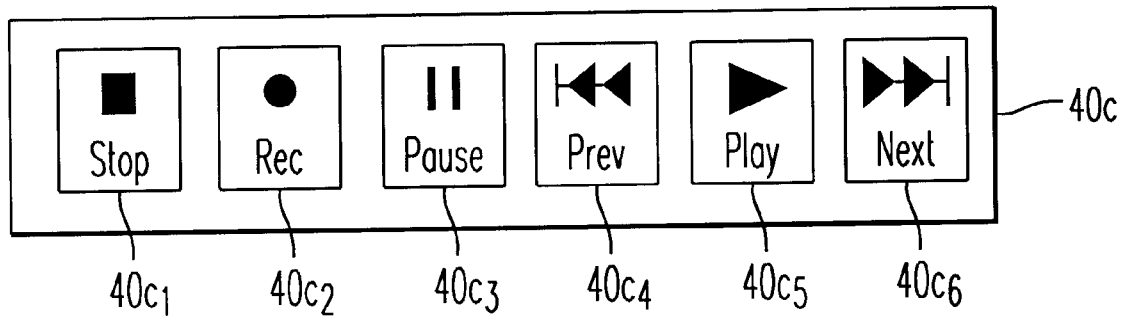

The components of the second image processing system 9 operate in the same manner as the corresponding parts in the image processing system 8, as will become apparent from the following description. The display unit 40 has a main display 40a, a subdisplay 40b, toolboxes 40c through 40e, etc. An operation path history toolbox 40c contains keys to carry out reproduction, etc., which include keys 40c1 through 40c6 (shown in FIG. 35) which enable the operator to control the operation path history. The input unit 43 receives information regarding the occurrence of commands which are the result of the operation of the mouse 41 or keyboard 42. These commands initiate the operation of one or more components in the second image processing system 9. The mesh formation unit 46 extracts the outlines of multiple stock images of a prescribed region of the body, forming endoscopic images Ai. The top and bottom outlines extracted are dissociated into data to form a series of dots which are connected to form meshes. The semitransparency formation unit 47 makes endoscopic images Ai semitransparent by thinning the pixels by a predetermined amount which can be set by the operator. The image moving and rotating unit 48 moves or rotates endoscopic images Ai based on the operation of the image movement and rotation toolbox 40d, explained later. The operation path history control unit 49 prepares guiding data which are images stored in the display unit memory 50 on the main display 40a and subdisplay 40b via operation of the keys in the operation path history toolbox 40c. For example, outer shape images Bi from the stored guiding data are displayed on the subdisplay 40b, and at the same time, endoscopic images Ai (including focus markers, guiding markers, body position compass images, etc.) are displayed on the main display 40a. The data sending and receiving unit 51 communicates with the image processing system 8 of the simulation room to receive endoscopic guide data which is then stored in the display unit memory 50. The image control unit 52 controls the images on the display unit 40 based on events fed from the input unit 43 and the instructions from the remaining components of the second image processing system 9.

The operation of two image processing systems working together will be described with reference to FIGS. 2 and 34. If a data transfer request from the second image processing system 9 in the endoscopic examination room occurs, the data receiving and sending unit 29 inputs the ID code of the subject 3a, reads in the endoscopic guide data associated with the ID code of the subject 3a, and transfers the endoscopic guide data to the second image processing system 9 in the endoscopic examination room.

The data sending and receiving unit 51 of the second image processing system 9 stores the endoscopic guide data sent from the simulation room in the display unit memory 50. If the ID code of the subject 3a is input and key 40c5 of toolbox 40c. is selected, the operation path history management unit 49 can be used to prepare for display the endoscopic guide data stored the display unit memory 50 corresponding to the subject 3a. In this manner, simulation images such as those shown in FIGS. 28(a) through 32 can be generated in advance with the image processing system 8 and later displayed on the display unit 40 of the second image processing system 9.

Further, the mesh formation unit 46 or semitransparency formation unit 47 can prepare meshed or semitransparent endoscopic images when the endoscopic guide data received from the first image processing system 8 includes an endoscopic image Ai. If an endoscope tip 2a is inserted into a subject 3a in the endoscopic examination room, the operator can use the endoscope operating member 2b to maneuver the endoscope tip 2a while comparing endoscopic images Ai which have been prepared with guiding markers and other images with the monitor 5 of the electronic endoscope device 1.

Further, the second image processing system 9 in the endoscopic examination room has an image moving and rotating unit 48. Therefore, it is possible to carry out image movement and rotation with the second image processing system 9 by using keys 40d1 through 40d5 in the same manner as with keys 11d1 through 11d5 of the image processing system 8.

Virtual Operation Device

Referring back to FIG. 2, the image processing system 8 in the simulation room is connected to a virtual operation device 61 by a cable, for example, an RS232C cable. The virtual endoscope is maneuvered using the virtual operation device 61 in the same manner as that of the endoscope operating member 2b (using a dial, a grip, etc.), and the endoscopic image Ai is changed in accordance with the movement of the virtual endoscope. Endoscopic guide data obtained using the virtual operation device 61 can be transmitted via the data sender/receiver 29 to the image processing system 9 in the endoscopic examination room.

Figure 1:
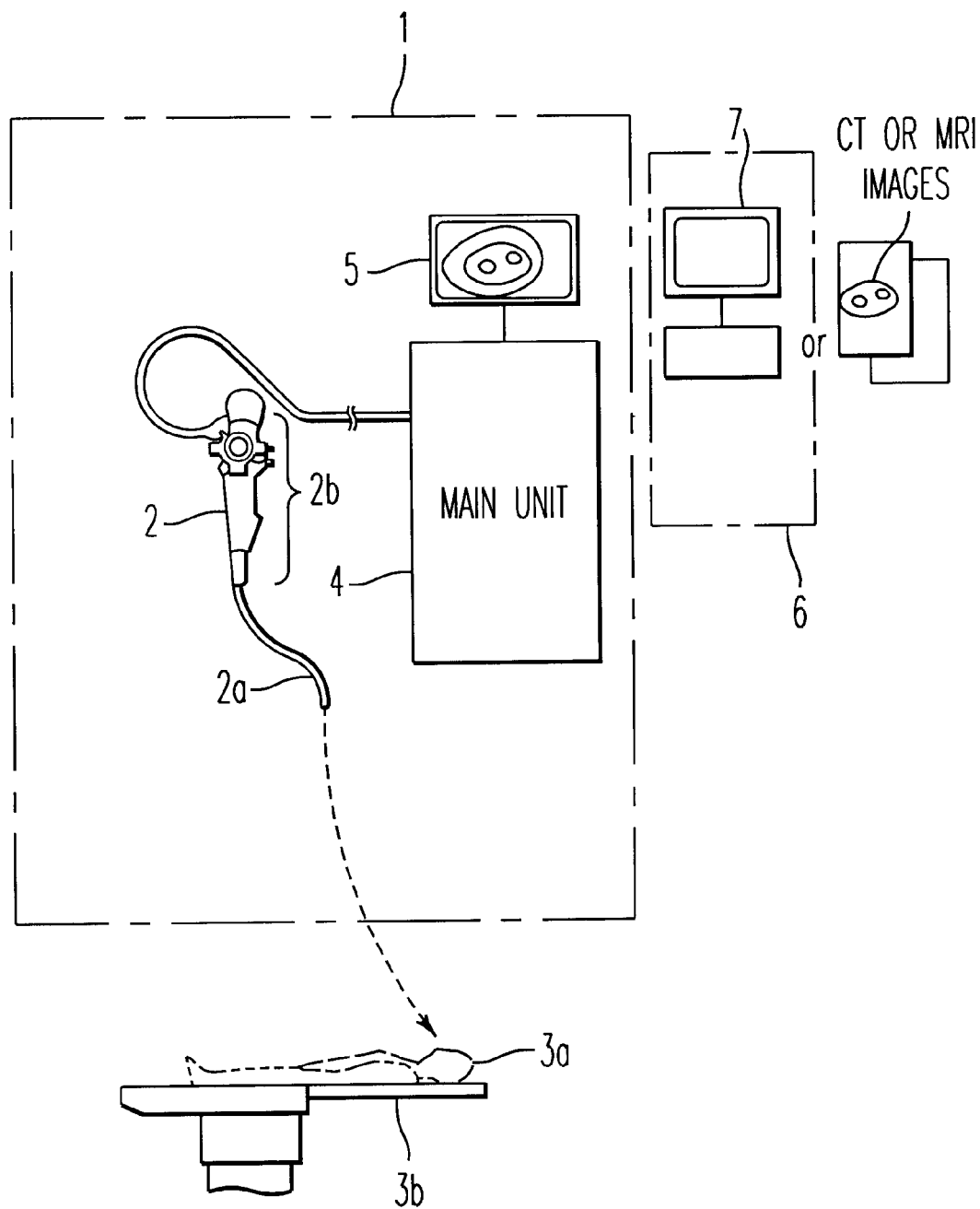
FIG. 1 is a schematic illustration of a conventional electronic endoscope device.
Figure 36:
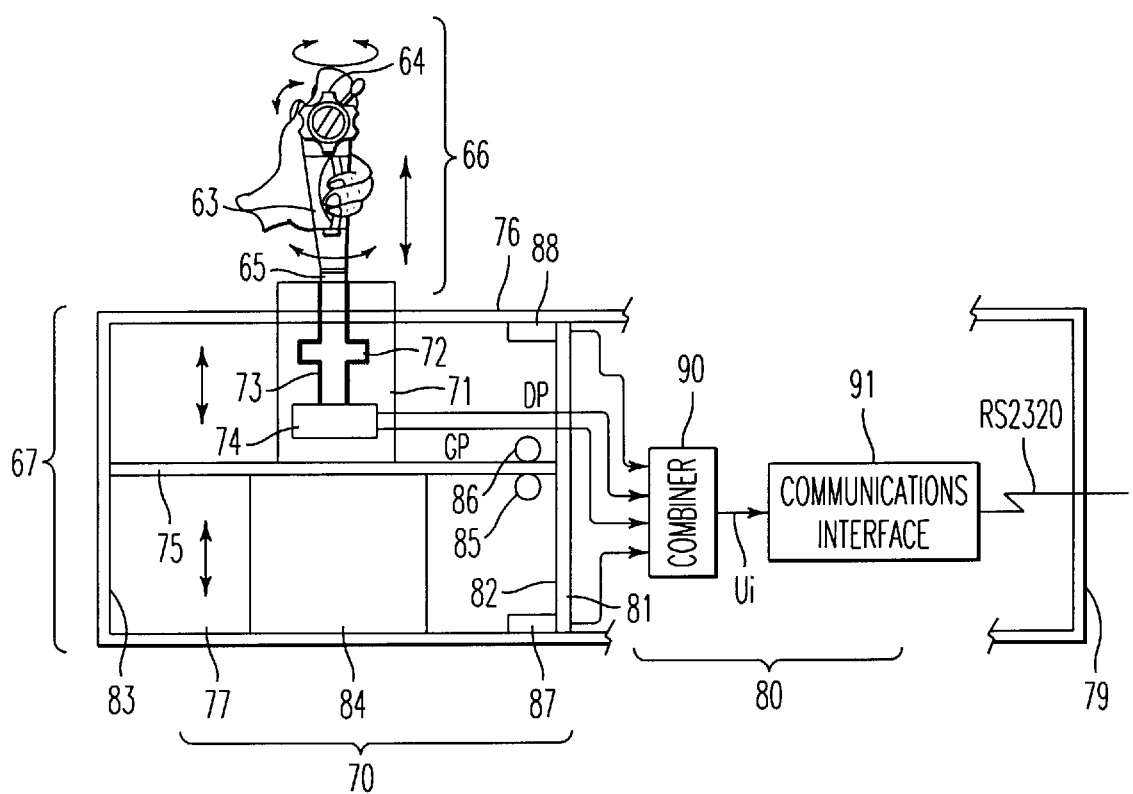
FIG. 36 is a schematic illustration of a virtual operation device used to control movement of the virtual endoscope throughout a virtual human body.

FIG. 36 is a schematic illustration of the virtual operation device 61. The virtual operation device 61 includes a virtual operation member 66 having a grip 63, a dial 64, and a connecting element 65 identical to those of the endoscope operating member 2b of the actual endoscope 2 (FIG. 1). The virtual operation device 61 further includes a support base 67 which supports the virtual operation member 66 in a manner permitting vertical movement and which supports the grip 63 in a manner permitting rotation of the grip around a vertical axis. Further, the dial 64 is positioned on the virtual operation member 66 in a manner permitting rotation of the dial around a horizontal axis.

The image processing system 8 generates a three-dimensional model of a desired part of the subject 3a based on multiple images and generates guiding markers which label the direction in which to proceed, as discussed above. The image processing system 8 also responds to commands received as the result of the operation of the grip 63 and dial 64 in the same manner as commands received from the mouse 12 and keyboard 13. Based on the operation of the grip 63 and dial 64, the image processing system 8 generates and displays endoscopic images Ai corresponding to different viewpoint positions and view directions obtained by operating the virtual operation device 61.

The virtual operation device 61 further includes: a linkage mechanism 70 which supports the virtual operation member 66 in a manner permitting the virtual operation member to move vertically and rotate freely; and an electric circuit element 80 which processes signals from the linkage mechanism 70 in a prescribed manner.

The connecting element 65 on the lower part of the virtual operation member 66 is cylindrical. When the grip 63 is pulled upward, it is caught in an enclosure 71 provided with an encoder (not shown). A ring member 72 which rotates with the grip 63 is also provided on a casing 73 of the enclosure 71. The connecting element 65 is housed in the casing 73, and the connecting element 65 is received by the support base 67 in a manner permitting unencumbered rotation of the connecting element 65. The grip 63 is also provided with a circuit (not shown) which detects the direction of the rotation of the dial 64 and transmits a dial rotation direction signal (DP) based on the rotation (or lack thereof) of the dial 64 to an encoder member 74. The dial rotation signal (DP) may have values indicating clockwise rotation of the dial (DP=DPcw), counterclockwise rotation of the dial (DP=DPccw), and no rotation of the dial (DP=DPO). The line transmitting the signal DP passes through the interior of the connecting element 65.

In the enclosure 71, there is an encoder member 74 on the bottom of the casing 73 which detects rotation of the grip, and generates a grip rotation direction signal (GP) indicating the direction of rotation of the grip 63. The signal GP may have values indicating clockwise rotation (GP=GPcw), counterclockwise rotation (GP=GPccw), or no rotation (GP=GPO). The encoder member transmits the signals GP and DP to the converter 90.

Figure 37A:
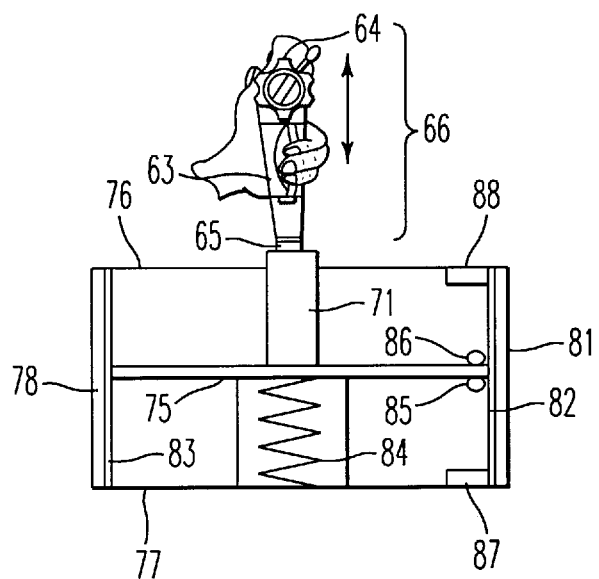
FIGS. 37(a), 37(b), and 37(c) are illustrations demonstrating the operation of the virtual operation device when used to advance and retract the virtual endoscope.

The bottom of the enclosure 71 is secured to the top surface of the middle plate 75 of the support base 67. Referring now to FIG. 37(*a*), the support base 67 has a shape of a box having a top plate 76, a bottom plate 77, a side plate 78, and a partition plate 81. Within the support base 67 is a first guide 82 on the partition plate 81 and a second guide 83 on the side plate 78.

A vertical motion linkage member 84 is provided between the middle plate 75 and the bottom plate 77. The vertical motion linkage member 84 is constructed to apply an upward force so that the middle plate 75 is positioned in the center of the first and second guides 82 and 83 when the ring member 72 of the virtual operation member 66 has not been displaced vertically. The vertical motion linkage member 84 preferably applies an upward or downward force (for example the degree of force applied when an actual endoscope is inserted or pulled) on the middle plate 75 with a spring, hydraulics, air pressure, or the like.

A first protrusion 86 is secured to the upper surface of the end of the middle plate 75 near the partition 81, and a second protrusion 85 is provided at the same position on the opposite side of the middle plate 75. A first switch 87 is provided at a position opposite the second protrusion 85 on the bottom plate 77, and a second switch 88 is provided on the top plate 76 at a position opposite the first protrusion 86.

Referring back to FIG. 36, the electric circuit element 80 of the support base 67 includes a combiner 90 and a first communications interface 91. The combiner 90 generates operation status data Ui by combining a signal (GU) from the second switch 88 mounted on the top plate 76, a signal (GD) from the first switch 87 mounted on the bottom plate 77, and the signals GP and DP from the encoder member 74. The combiner 90 transmits the operation status data Ui to the first communications interface 91 which transmits the operation status data Ui to the image processing system 8 via the RS232C cable.

When both the second switch 88 of the top plate 76 and the first switch 87 of the bottom plate 77 are OFF, a middle plate initial position signal (GM), indicating that the middle plate 75 is in its initial position (for example, the middle of the base support 67) is generated and combined with the operation status data in place of signals GU and GD. The first communications interface 91 employs data-terminal equipment (DTE) which sends the operation status data Ui to the image processing system 8 through the RS232C cable.

Referring again to FIG. 37(*a*), when the grip 63 of the virtual operation member 66 is not gripped (i.e., the grip is not being moved vertically), the vertical motion linkage member 84 is positioned in the middle of the first and second guides 82 and 83 on the middle plate 75 and the second switch 88 of the top plate 76 and the first switch 87 of the bottom plage 77 are in the OFF state.

When the grip 63 of the virtual operation member 66 shown in FIG. 37(*a*) is gripped and pressed downward to the position shown in FIG. 37(*b*)), the vertical motion linkage member 84 is compressed and the second protrusion 85, mounted on the bottom side of the middle plate 75, is brought into contact with the first switch 87 to turn the first switch 87 ON.

When the grip 63 of the virtual operation member 66 is gripped and pulled upward, as shown in FIG. 37(*c*), the vertical motion linkage member 84 extends, and the first protrusion 86, mounted on the top side of the middle plate 75, is brought into contact with the second switch 88 to turn the second switch 88 ON.

In the image processing system, the mouse 12, the keyboard 13, and the virtual operation device 61 are connected to the input unit 14. When operation status data Ui are input from the virtual operation device 61, the input unit 14 receives and interprets the operation status data Ui in the same manner as it interprets commands from the mouse 12 and the keyboard 13. Upon interpreting the operation status data Ui, the input unit 14 sends instructions to modify the images on the display unit 11 to the individual components of the image processing system 8 based on the commands received from the virtual operation device 61.

Figure 38:
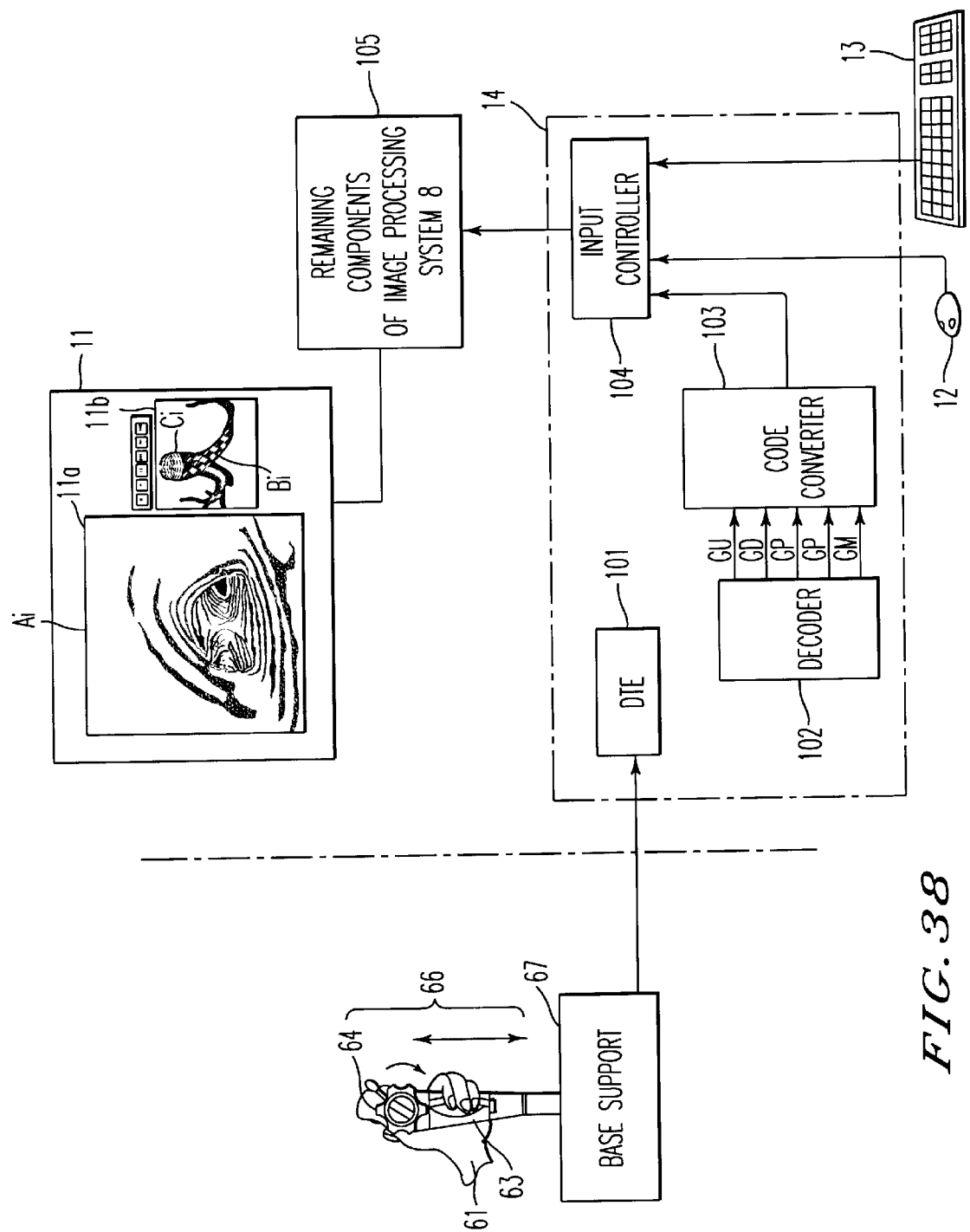
FIG. 38 is a schematic illustration of an input unit and its relation to the virtual operation device and the remainder of the image processing system.

As shown in FIG. 38, the input unit 14 includes: a communications interface 101 employing DTE which receives the operation status data Ui from the virtual operation device 61; a decoder 102 which interprets the operation status data Ui from the communication interface 101; a code converter 103 which converts data from the decoder 102 into commands of the same type as are received from the keyboard 13 and the mouse 12; and an input controller 104 which inputs commands from the code converter 103, the mouse 12, and the keyboard 13 and instructs the remaining components 105 of the image processing system 8 to simulate endoscopic movement in accordance with the commands received from the virtual operation device 61. The remaining components 105 modify the images on the display unit 11 to correspond to movement of the virtual endoscope.

Figure 37B:
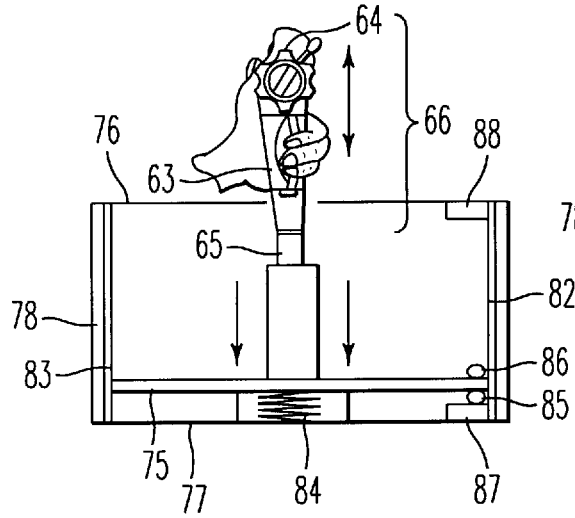

To operate the virtual operation device 61, the operator first employs the keyboard 13 to designate the virtual operation device 61 as the device for changing the viewpoint position and the view direction. Referring back to FIGS. 37(*a*), 37(*b*), and 37(*c*), when an endoscopic image Ai is being displayed and the operator grips the grip 63 of the virtual operation device 61 and presses downward, the resulting force (referred to as the downward force) is transmitted through the connecting element 65 of the linkage mechanism 70, enclosure 71, and the middle plate 75 to the vertical motion linkage member 84. The downward force compresses the vertical motion linkage member 84 as shown in FIG. 37(b), for example. The second protrusion 85 of the middle plate 75 contacts the first switch 87 of the bottom plate 77, turning ON the first switch 87. The second switch 88 of the top plate 76 is in the OFF state at this time. The encoder member 74 of the enclosure 71 (the latter being connected to the virtual operation member 66 by the connecting element 65) transmits the signals GP and DP. At this time, DP=DPO and GP=GPO, indicating that there is no dial rotation or grip rotation, respectively. The first switch 87 of the bottom plate 77 transmits a grip down ON signal (GD=GDon), and the second switch 88 of the top plate 76 transmits a grip pull OFF signal (GU=GUoff). The signals GP and DP are sent to the combiner 90 where they are converted to operation status data Ui and are sent through the communication interface 91 to the image processing system 8. The communication interface 101 of the input unit 14 receives the operation status data Ui and the decoder 102 separates the operation status data Ui. The input unit controller 104 of the image processing system 8 inputs commands to the remaining components 105 on the basis of the operation status data Ui.

In the present description, since the grip 63 has been pressed downward, turning on the first switch 87 of the bottom plate 77, the signals GDon, GUoff, GPO, and DPO are combined into the operation status data Ui and sent to the decoder 102 which separates the operation status data Ui.

Next, the code converter 103 determines which, if any, of the individual signals from the decoder 102 are different from the previous signal, and converts any signals that are different to commands of the same type as received from the mouse 12 or the keyboard 13. The code converter 103 sends these commands to the input controller 104 which transmits the commands to the remaining components 105. The remaining components determine the movement of the virtual endoscope based on the commands and adjust the images on the display unit 11 accordingly.

For example, when the signal GD changes from GDoff to GDon, the code converter 103 converts the signal GD to the same command generated when the right button on the mouse 12 is clicked. The code converter 103 transmits this command to the input controller 104 which inputs the command generated when the right button on the mouse 12 is clicked. This input is interpreted as a command to advance the endoscope and is sent to the endoscopic image preparation unit 16, the endoscope tip state computation unit 22, etc. The endoscope tip state computation unit 22 moves the indicator image Ci of the subdisplay 11b in the view direction and informs the endoscopic image preparation unit 16 of the new viewpoint position. Further, when the grip 63 of the virtual operation device 61 is pressed downward, the viewpoint position is moved in the view direction over a distance corresponding to how long the downward pressure is applied. For example, if the command to advance the endoscope lasts for five seconds, the virtual endoscope will advance about 5 millimeters.

Following the movement of the indicator image Ci, the endoscopic image preparation unit 16 displays on the main display 11a an endoscopic image Ai of the interior of the three-dimensional model in the view direction and from the viewpoint position indicated by the indicator image Ci. For example, referring back to FIG. 10(b), the endoscopic image Aip from the new viewpoint position is displayed in the main display 11a. Therefore, when the grip 63 of the virtual operation device 61 is pressed downward, it is possible to obtain an endoscopic image from an advanced viewpoint position corresponding to how long the downward pressure was applied to the grip 63. At the same time, the impact determining unit 79 determines whether or not the virtual endoscope can pass through the interior of the cavity if the viewpoint position has changed.

Figure 37C:
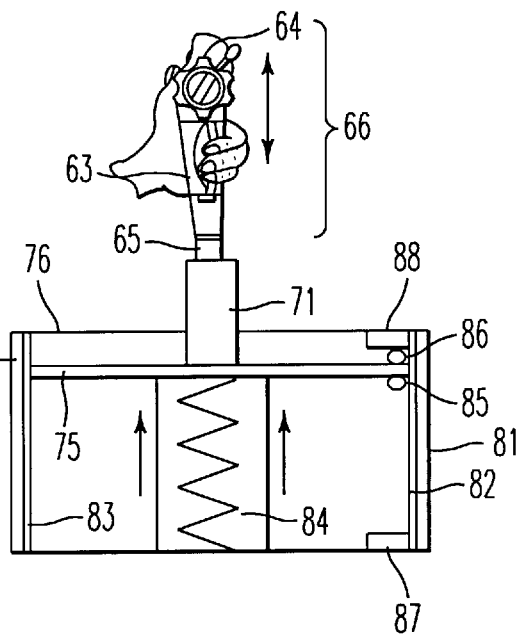

If the grip 63 of the virtual operation device 61 is gripped and pulled upward by the operator, the resulting force (referred to as the pull force) is transmitted through the connecting member 65, the enclosure 71, and the middle plate 75 to the vertical motion linkage member 84. The vertical motion linkage member 84 extends as a result of the pull force, as shown in FIG. 37(c) for example. The first protrusion 86 of the middle plate 75 and the second switch 88 of the top plate 76 come into contact, turning ON the second switch 88. The first switch 87 of the bottom plate 77 is in the OFF state at that time.

Thus, when the grip 63 is gripped and the virtual operation member 66 is pulled upward, the first switch 87 transmits a grip down OFF signal (GD=GDoff), and the second switch 88 transmits a grip pull ON signal (GU=GUon). Since neither the grip 63 nor the dial 64 has been rotated in either direction, the signals GPO, DPO, GDoff, and GUon are combined into operation status data Ui by the combiner 90 and transmitted to the decoder 102 which separates the operation status data Ui.

When the signal GU changes from GUoff to GUon, the code converter 103 converts the signal GU to the command generated when the left button of the mouse 12 is clicked and transmits this command to the input controller 104 which inputs the same command generated when the left button of the mouse 12 is clicked (an endoscope pull command) to the endoscopic image preparation unit 16 and the endoscope tip state computation unit 22. While inputting an endoscope pull command, the endoscope tip state computation unit 22 moves the indicator image Ci of the subdisplay 11b upward and informs the endoscopic image preparation unit 16 of the new position. Thus, when the grip 63 of the virtual operation device 61 is pulled, the viewpoint position is retracted across a distance corresponding to how long the pull force is applied. For example, when the endoscope pull command lasts for five seconds, the virtual endoscope retracts about 5 millimeters.

Following the retraction (movement in the direction opposite the view direction, for example, from the position shown in FIG. 10(b) to the position shown in FIG. 10(a)) of the indicator image Ci, the endoscopic image preparation unit 16 displays on the main display 11a an endoscopic image Ai of the interior of the three-dimensional model in the view direction and from the viewpoint position indicated by the indicator image Ci. Thus, when the grip 63 of the virtual operation device 61 is pulled upward, it is possible to obtain an endoscopic image Ai at a retracted viewpoint position based on the duration of the pull force.

The rotation of the grip 63 will now be described, assuming that the center plate 75 is positioned in the middle of the base support 67 so that the signal GM is being generated. When the grip 63 is rotated in either the clockwise or the counterclockwise direction, the encoder member 74 positioned in the enclosure 71 of the support base 67 detects the direction of the rotation of the grip 63 and transmits a grip rotation direction signal GP based on the direction of the rotation. GP=GPcw when the grip is rotated in the clockwise rotation, and GP=GPccw when the grip is rotated in the counterclockwise direction.

Thus, when the middle plate 75 is positioned in the middle of the base support 67, the signals GM, GPcw or GPccw, and DPO are combined as operation status data Ui and sent to the image processing system 8 by the combiner 90. The code converter 103 transmits to the input controller 104 a command corresponding to that generated by, for example, the Home key or the End key (for clockwise or counterclockwise rotation, respectively) on the keyboard 13.

When the input controller 104 inputs said command corresponding to the Home key or the End key, the command is sent to the endoscopic image preparation unit 16 and the endoscope tip state computation unit 22 as a grip clockwise rotation command or a grip counterclockwise rotation command. The endoscope tip state computation unit 22 adjusts the indicator image Ci by rotating the green hemisphere 36 about the yellow sphere 35 in the appropriate direction. Thus, when the grip 63 of the virtual operation device 61 is rotated, the upward vector is changed by rotating the reference direction about an axis defined by the view direction. Following the rotation of the indicator image Ci, the endoscopic image preparation unit 16 prepares an endoscopic image Ai corresponding to the new upward vector from the same viewpoint position and view direction in the three-dimensional model indicated by the indicator image Ci.

The operation of the dial 64 will now be described, assuming that the center plate 75 is in the middle of the base support 67 and that the signal GM is being transmitted. When the dial 64 is turned, the signal DP indicates clockwise (DP=DPcw) or counterclockwise rotation (DP=DPccw) and is sent through the encoder member 74 to the combiner 90.

Thus, the signals GM, DPcw or DPccw, and GPO are combined into operation status data Ui by the combiner 90 and transmitted to the image processing system 8. The code converter 103 determines whether the individual signals from the decoder 102 have changed. When there is a different signal, the code converter 103 converts the different signal into a signal identical to that received from the mouse 12 or the keyboard 13. The code converter 103 then transmits the converted signal through the input controller 104 to the remaining components 105 of the image processing system 8 to simulate endoscopic movement in accordance with the operation of the virtual operation device 61. For example, if the signal DPcw is transmitted, the command corresponding to the "K" key on the keyboard 13 is transmitted to the input controller 104. If the signal DPccw is transmitted, the command corresponding to the "J" key on the keyboard 13 is transmitted to the input controller 104. When the input controller 104 inputs the command corresponding to the "J" key or the "K", a dial counterclockwise rotation or a dial clockwise rotation command, respectively, is transmitted to the endoscopic image preparation unit 16, the endoscope tip state computation unit 22, etc.

While a dial counterclockwise rotation command or a dial clockwise rotation command is input, the endoscope tip state computation unit 22 changes the vertical angle of the view direction. Thus, when the dial 64 of the virtual operation member 66 is turned, the view direction changes up or down in the vertical direction.

After the change in view direction is reflected by the change in the angle between the red bar 37 and the green hemisphere 36 of the indicator image Ci, the endoscopic image preparation unit 16 displays in the main display 11a a new endoscopic image Ai corresponding to the new view direction from the same viewpoint position within the three-dimensional model.

If the grip 63 of the virtual operation device 61 is pressed downward, a series of endoscopic images Ai in which the current viewpoint position is advanced are shown in the main display 11a. If the grip of the virtual operation device 61 is pulled, a series of endoscopic images Ai in which the current viewpoint position is retracted are shown in the main display 11a. When the grip 63 is rotated, a series of endoscopic images Ai corresponding to the rotation of the upward vector around the view direction are shown in the main display 11a. Similarly, when the dial 64 is turned, the view direction changes in the vertical direction (upward or downward).

The impact determining unit 79 stores the dimensions of the virtual endoscope which may be the same as the actual endoscope which will be employed in a future operation. These dimensions include the diameter of the endoscope, the endoscope length, etc. This information is used by the impact determining unit 79 to preclude the virtual endoscope from moving into cavities which are smaller than the endoscope diameter and to prevent the virtual endoscope from being advanced farther than its length allows.

Accordingly, it is possible to conduct simulations which are more realistic than preoperative simulations which incorporate only a mouse and a keyboard. Further, an operator can become familiar with the control of an actual endoscope by practicing with the virtual operation device 61 before conducting a real examination of the human subject 3a. As a result, the operation of the actual endoscope 2 during the real examination is made easier and patient discomfort can be reduced.

Alternatively, the virtual operation device 61 may have a second dial (not shown). The second dial may be used to make fine changes to the view direction in the horizontal direction. The code converter 103 converts the dial rotation direction signal of the second dial into a command corresponding to the right direction key ("L" key) or the left direction key ("H" key), for example. The code converter 103 then transmits the command resulting from the operation of the second dial to the input controller 104.

Further, as stated previously, the second image processing system 9 in the endoscopic examination room can be configured identically to the image processing system 8 in the simulation room. Thus, the second image processing system 9 in the endoscopic examination room may be provided with a virtual operation device 61, an impact determining unit 79, etc.

Computer Implementation

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Figure 39:
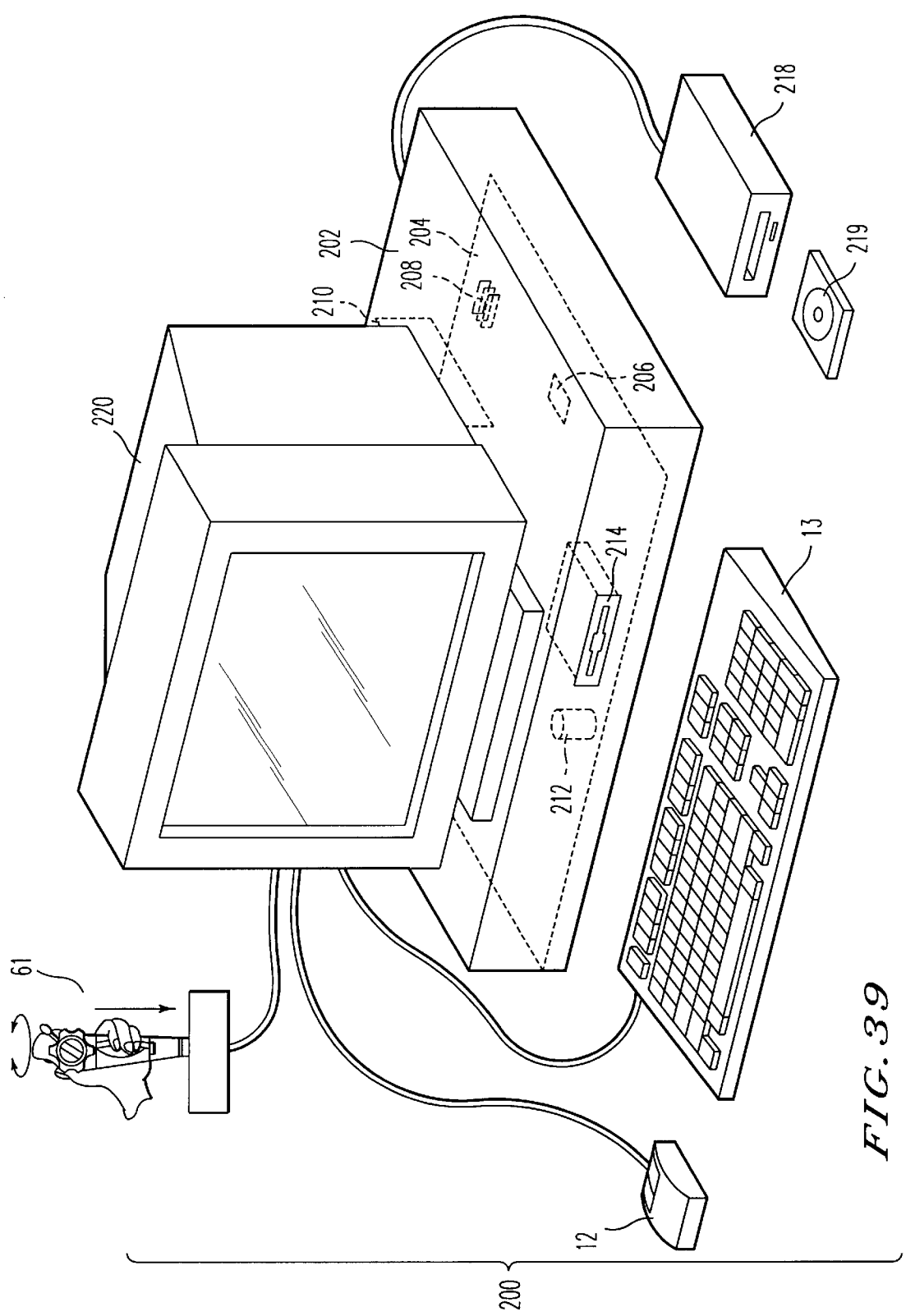
FIG. 39 is an schematic illustration of a general purpose computer 200 programmed according to the teachings of the present invention.

FIG. 39 is a schematic illustration of a general purpose computer 200 programmed according to the teachings of the present invention. The general purpose computer 200 includes a computer housing 202 having a motherboard 204 which contains a CPU 206 and memory 208. The computer 200 also includes plural input devices (e.g., a keyboard 13, a mouse 12, and a virtual operation device 61) and a display card 210 for controlling a monitor 220. In addition, the computer system 200 further includes a floppy disk drive 214 and other removable media devices (e.g., tape, and removable magneto-optical media (not shown)), a hard disk 212, or other fixed, high density media drives, connected using an appropriate device bus, e.g., a SCSI bus or an Enhanced IDE bus. Also connected to the same device bus or another device bus, the computer 200 may additionally include a compact disc reader/writer 218 for reading/writing to a compact disc 219, or a compact disc jukebox (not shown).

Stored on any one of the above described storage mediums (computer readable media), the present invention includes programming for controlling both the hardware of the computer 200 and for enabling the computer 200 to interact with a human user. Such programming may include, but is not limited to, software for implementation of device drivers, operating systems, and user applications. Such computer readable media further includes programming or software instructions to direct the general purpose computer 200 to perform tasks in accordance with the present invention.

The programming of general purpose computer 200 includes, but is not limited to, software modules for performing the same functions as the various components of the image processing system 8 shown in FIG. 2. Thus, the general purpose computer 200 would be programmed to include software modules for receiving inputs from the keyboard 13, mouse 12, and virtual operation device 61, performing image data extraction, preparing endoscopic images, storing color data, preparing indicator images, preparing three-dimensional models, determining the orientation of the virtual body relative to the virtual endoscope tip, preparing compass images, determining the endoscope tip state, generating mesh images, generating semitransparent images, preparing guiding markers, moving and rotating images in accordance with the movement of the virtual endoscope tip, determining the shortest path between to positions in a three-dimensional model, saving and replaying the operation path history, sending and receiving data to another image processing system, controlling images, storing and/or retrieving stock images, preparing outer shape images, determining whether the dimensions of the virtual endoscope tip permit its advance or its movement to different regions of the organ being examined, and displaying images. Another general purpose computer (not shown), identical to the general purpose computer 200 of FIG. 39, may be programmed to include software modules for performing the same functions as the various components of the image processing system of FIG. 34. In this manner, the system illustrated in FIG. 33 could be implemented by programming two general purpose computers—one in an examination room and one in a simulation room—according to the teachings of the present invention.

Obviously, numerous modifications and variations of the present invention are possible in light of the above teachings. It is therefore to be understood that within the scope of the appended claims, the invention may be practiced otherwise than as specifically described herein.

The present application is based on Japanese Patent Application Nos. P09-044435, P09-044436, P09-044441, P09-044495, and P10-013074, the subject matter of which is incorporated by reference herein.

What is claimed as new and desired to be secured by Letters Patent of the United States is:

1. An image processing system for displaying a three-dimensional object from a viewpoint position and in a view direction, comprising:

a three-dimensional model preparation unit configured to construct a three-dimensional model of the three-dimensional object;

an input unit configured to change the viewpoint position and the view direction by receiving commands to change the viewpoint position and the view direction from an input device;

an endoscopic image preparation unit configured to prepare for displaying an endoscopic image of the three-dimensional object as viewed from the viewpoint position and in the view direction;

an endoscopic image display which displays the endoscopic image;

an outer shape image preparation unit configured to prepare an outer shape image of the three-dimensional object from the three-dimensional model;

an indicator preparation unit configured to prepare for displaying an indicator image based on the viewpoint position, the view direction and a body position reference information, wherein the indicator image indicates the viewpoint position, the view direction and a reference direction; and an outer shape image display which displays the indicator image and the outer shape image simultaneously next to the displayed endoscopic image such that the location and orientation of the indicator image relative to the three-dimensional model indicates at least the viewpoint position and view direction relative to the three-dimensional model.

2. The image processing system of claim 1, wherein the indicator image comprises:

a first element indicative of the viewpoint position;

a second element indicative of the view direction; and a third element indicative of the reference direction.

3. The image processing system of claim 2, wherein the first, second, and third elements are different colors.

4. The image processing system of claim 1, further comprising:

a guiding marker preparation unit configured to prepare for display on the endoscopic image an at least one guiding marker indicative of a direction in which an endoscope tip is to be advanced; and said endoscopic image display configured to display the endoscopic image and the at least one guiding marker.

5. A method for displaying a three-dimensional object from a viewpoint position and in a view direction, said method comprising the steps of:

constructing a three-dimensional model of the three-dimensional object;

preparing an outer shape image of the three-dimensional object from the three dimensional model and a body position reference information;

displaying the outer shape image in an outer shape image display;

preparing an indicator image indicating at least the viewpoint position and the view direction; and displaying the indicator image and the outer shape image simultaneously such that the location and orientation of the indicator image relative to the outer shape image indicates at least the viewpoint position and the view direction relative to the three-dimensional model.

6. The method of claim 5 further comprising the step of:

providing the indicator image with a first element indicating the viewpoint position, a second element indicating the view direction, and a third element indicating a reference direction.

7. The method of claim 5, wherein the step of displaying the indicator image further includes the step of:

displaying the first, second, and third elements of the indicator image in different colors.

8. A computer-readable medium having computer-executable instructions for performing the steps in the method recited in any one of claims 5, 6 or 7.

9. The method of claim 5, further comprising:

preparing an at least one guiding marker for display on the endoscopic image, said guiding marker indicating a direction in which an endoscope is to be advanced; and displaying the endoscopic image and the at least one guiding marker in an endoscopic image display.

10. The method of claim 9, further comprising the step of:

selecting the location of the guiding marker on the endoscopic image.

11. The method of claim 9, further comprising the step of:

storing the location of the guiding marker relative to the three-dimensional model.

12. The method of claim 9, wherein the step of preparing the at least one guiding marker includes the step of:

providing the at least one guiding marker with the appearance of at least one of an X-shape, an up arrow, a down arrow, a right arrow, a left arrow, optional direction arrows, and text.

13. A computer-readable medium having computer-executable instructions for performing the steps in the method recited in any one of claims 9–12.

14. An image processing system for displaying a three-dimensional object from a viewpoint position and in a view direction, comprising:

a three-dimensional model preparation unit configured to construct a three-dimensional model of the three-dimensional object;

an endoscopic image preparation unit configured to prepare for displaying an endoscopic image of the three-dimensional model as viewed from the viewpoint position and in the view direction;

a compass image preparation unit configured to prepare for displaying a compass image, wherein the compass image comprises projections in the axial direction of a subject and in directions perpendicular to the axial direction of a virtual subject; and an endoscopic image display which displays the endoscopic image and displays the compass image over the endoscopic image.

15. The image processing system of claim 14, wherein the compass, image further comprises:

labels proximal to each of the projections, each label being indicative of the direction in which the corresponding projection points relative to the virtual subject.

16. The image processing system of claim 14, wherein the projections which point in opposite directions have the same color and the projections which do not point in opposite directions have different colors.

17. The image processing system of claim 14, wherein the compass image preparation unit comprises:

shaping means for providing the compass image with the shape of the three-dimensional object.

18. The image processing system of claim 14, wherein said shaping means comprises:

means for providing the compass image with a spherical shape.

19. The image processing system of claim 14, wherein the compass image preparation unit comprises:

pattern forming means for providing the compass image with a network pattern.

20. The image processing system of claim 14, wherein the compass image preparation unit comprises:

coloring means for providing each half of the compass image with a different color.

21. The image processing system of claim 17, wherein said shaping means comprises:

means for providing the compass image with the shape of a human body.

22. The image processing system of claim 17, wherein said shaping means comprises:

means for providing the compass image with the shape of an organ.

23. The image processing system of claim 14, further comprising:

an operation path history control unit configured to prepare for display a sequence of past images corresponding to a sequence of past viewpoint positions, view directions, and reference directions;

wherein said endoscopic image display is further configured to display said past images and to display said compass image over said past images.

24. A method for displaying a three-dimensional object from a viewpoint position and in a view direction, said method comprising the steps of:

constructing a three-dimensional model of the three-dimensional object;

preparing for display an endoscopic image of the three-dimensional model as viewed from the viewpoint position and in the view direction;

displaying the endoscopic image in an endoscopic display;

generating for display a compass image including projections in the axial direction of a subject and in directions perpendicular to the axial direction of the subject; and displaying the compass image over the endoscopic image in the endoscopic display.

25. The method of claim 24, wherein the step of displaying the compass image includes:

displaying the projections which point in opposite directions int he same color; and displaying the projections which do not point in opposite directions in different colors.

26. The method of claim 24, wherein the step of generating includes the step of: providing the compass image with the shape of a sphere.

27. The method of claim 24, wherein the step of generating includes the step of:

providing the surface of the compass image with a network pattern.

28. The method of claim 24, wherein the step of displaying includes the step of:

displaying each half of the compass image in a different color.

29. A computer-readable medium having computer-executable instructions for performing the steps in the method recited in any one of claim 24 or 25–28.

* * * * *

UNITED STATES PATENT AND TRADEMARK OFFICE
CERTIFICATE OF CORRECTION

PATENT NO.      : 6,346,940 B1
DATED           : February 12, 2002
INVENTOR(S)     : Tomohisa Fukunaga It is certified that error appears in the above-identified patent and that said Letters Patent is hereby corrected as shown below:

<u>Title page,</u>
After the ABSTRACT, change "29 Claims, 34 Drawing Sheets" to -- 32 Claims, 34 Drawing Sheets --

<u>Column 32,</u>
Line 65, insert the following:
-- 30.   The image processing system according to Claim 4, wherein the guiding marker preparation unit comprises:

selecting means for allowing the location of the at least one guiding marker on the endoscopic image display to be selectable.

31.   The image processing system according to Claim 4, wherein the guiding marker preparation unit comprises:

storing means for storing the location of the guiding marker relative to the three-dimensional model.

32.   The image processing system according to Claim 4, wherein the at least one guiding marker comprises:

at least one of an X-shaped marker, an up arrow marker, a down arrow marker, a right arrow marker, a left arrow marker, an optional direction marker, and text. --

Signed and Sealed this

Twenty-fifth Day of March, 2003

JAMES E. ROGAN
*Director of the United States Patent and Trademark Office*